(12) United States Patent
Liu

(10) Patent No.: US 10,212,594 B2
(45) Date of Patent: Feb. 19, 2019

(54) SYSTEM AND METHOD FOR SESSION ESTABLISHMENT BY UNAUTHENTICATED USER EQUIPMENT

(71) Applicant: Alcatel-Lucent USA Inc., Murray Hill, NJ (US)

(72) Inventor: Jennifer Liu, Plano, TX (US)

(73) Assignee: NOKIA OF AMERICA CORPORATION, Murray Hill, NJ (US)

( * ) Notice: Subject to any disclaimer, the term of this patent is extended or adjusted under 35 U.S.C. 154(b) by 0 days.

(21) Appl. No.: 15/886,787

(22) Filed: Feb. 1, 2018

(65) Prior Publication Data

US 2018/0227759 A1 Aug. 9, 2018

Related U.S. Application Data

(60) Provisional application No. 62/454,689, filed on Feb. 3, 2017.

(51) Int. Cl.
| | |
|---|---|
| *H04W 12/06* | (2009.01) |
| *H04W 28/18* | (2009.01) |
| *H04W 76/50* | (2018.01) |
| *H04L 29/06* | (2006.01) |
| *H04W 4/90* | (2018.01) |
| *H04W 12/08* | (2009.01) |
| *H04W 76/15* | (2018.01) |

(52) U.S. Cl.
CPC ......... *H04W 12/06* (2013.01); *H04L 63/0892* (2013.01); *H04L 63/205* (2013.01); *H04W 4/90* (2018.02); *H04W 12/08* (2013.01); *H04W 28/18* (2013.01); *H04W 76/50* (2018.02); *H04L 63/0428* (2013.01); *H04W 76/15* (2018.02)

(58) Field of Classification Search
CPC ....................................................... H04W 12/06
USPC .............................................. 455/411, 404.1
See application file for complete search history.

(56) References Cited

PUBLICATIONS

3GPP A Global Initiative. 3rd Generation Partnership Project. "Technical Specification Group Services and System Aspects; 3GPP System Architecture Evolution (SAE); Security aspects of non-3GPP accesses." 68 pp. (Release 14) (Dec. 2016).

3GPP A Global Initiative. 3rd Generation Partnership Project. "Technical Specification Group Services and System Aspects; Architecture enhancements for non-3GPP accesses." 307 pp. (Release 14) (Dec. 2016).

3GPP A Global Initiative. 3rd Generation Partnership Project. "Technical Specification Group Core Network and Terminals; Numbering, addressing and identification." 105 pp. (Release 14) (Dec. 2016).

(Continued)

*Primary Examiner* — Joel Ajayi
(74) *Attorney, Agent, or Firm* — Jessica W. Smith; Loza & Loza, LLP

(57) ABSTRACT

An authentication server establishes a network connection to user equipment (UE) in a non-3GPP compliant access network. The authentication server obtains an identity for the UE and determines that the UE is unauthenticated and requesting establishment through a non-3GPP compliant access network. The authentication server negotiates a connection mode with the unauthenticated UE and negotiates connection parameters for the connection mode with the unauthenticated UE. The authentication server may then establish a network connection through the non-3GPP compliant access network to the UE.

18 Claims, 29 Drawing Sheets

(56) References Cited

PUBLICATIONS

Nokia et al. "Emergency session for UICC-less and unauthenticated UE's over trusted access." 3GPP, 3rd Generation Partnership Project, vol. CT 2G1, Reno, NV (4 pp) (Dec. 5, 2016).

Nokia et al. "AAA server support of emergency session establishment over trusted access." 3GPP, 3rd Generation Partnership Project vol. CT WG1, Spokane, WA (6 pp). (Jan. 16, 2017).

3rd Generation Partnership Project. Technical Specification Group Core Network and Terminals, Access to the 3GPP Evolved Packet Core (EPC) via non-3GPP access networks; Stage 3 (137 pp) (Release 14) (Dec. 2016).

Alcatel-Lucent et al. "Update to solution 19 (unauthenticated UE)". 3GPP, 3rd Generation Partnership Project, Sophia-Antipolis, FR (Jan. 19, 2016).

Ericsson. "Parameter transport for unauthenticated emergency calls over trusted WLAN using vendor-specific EAP method." 3GPP, 3rd Generation Partnership Project, Sophia-Antipolis, FR (Feb. 2, 2017).

PCT/US2018/016713. International Search Report & Written Opinion (dated May 17, 2017).

UE to Network EAP Packet format using expanded types for TWAN-Info-Notification method UE to network EAP Packet format using expanded types for TWAN-Conn-Notification method EAP Packet format using EAP-Response/Notification method for SCM_mode negotiation

SYSTEM AND METHOD FOR SESSION ESTABLISHMENT BY UNAUTHENTICATED USER EQUIPMENT

RELATED APPLICATIONS

This application claims priority under 35 U.S.C. 119(e) to Provisional Application No. 62/454,689 filed on Feb. 3, 2017 and entitled, "System and Method for Session Establishment by Unauthenticated User Equipment," which is hereby incorporated by reference herein.

TECHNICAL FIELD

This application relates generally to access networks, and more specifically to session establishment by unauthenticated user equipment in an access network.

DESCRIPTION OF RELATED ART

The statements in this section provide a description of related art and are not admissions of prior art. User equipment (UE), such as smart phones, smart tablets, laptops, computers, smart watches, etc., often include capability for both wireless local area network (WLAN) connectivity (such as IEEE 802.11x compliant WLAN connectivity) and radio access network connectivity (such as technologies wholly or partially compliant with the 3rd generation partnership project (3GPP) set of standards including EVDO, UMTS, HSPA, and LTE). The UE may thus connect to the 3GPP evolved packet core (EPC) network using two types of access technologies composed of 3GPP access networks and non-3GPP access networks.

In general, 3GPP access networks are wholly or partially compliant with technologies specified by the 3GPP set of standards that include, e.g., GPRS, UMTS, EDGE, HSPA, LTE and LTE Advanced. Non-3GPP access networks are wholly or partially compliant with technologies that are not specified by the 3GPP set of standards. They include technologies such as cdma2000, WLAN (such as IEEE 802.11x compliant WLAN) or fixed networks.

The 3GPP set of standards specifies two classes of non-3GPP access technologies with different security mechanisms: untrusted access networks and trusted access networks. Untrusted access networks include access networks that may pose a higher security risk (for example, a public WLAN or femtocell access network).

Trusted access networks include access networks that the network operator considers have a level of trust from a security stand point and may interface directly with the EPC network. Prior to requesting access to the EPC network via a non-3GPP, trusted access network, under current 3GPP set of standards, a UE must perform an authentication process. In some instances, the EPC network authenticates the UE, and the UE may then gain access to the EPC network services. However, in some other instances, the EPC network fails to authenticate the UE. For example, the UE may not provide required authentication information during the authentication process, or the UE may not be able to proceed with or support the authentication process, or the UE may not have an installed smart card, such as a Universal Integrated Circuit Card (UICC). An unauthenticated UE requesting service in a non-3GPP, trusted access network is not currently allowed to establish a session with the EPC network or gain access to the EPC network services.

This failed access creates a problem because certain EPC network services are required to be available to any requesting UE, including an unauthenticated UE. For example, emergency session establishment is required for any requesting UE, including unauthenticated UEs.

Therefore, a need exists to provide a system and method that supports session establishment for an unauthenticated UE in trusted non-3GPP access networks. Other needs and benefits are also provided with embodiments described herein.

SUMMARY

In an embodiment,
In another embodiment,
In still another embodiment,

BRIEF DESCRIPTION OF THE SEVERAL VIEWS OF THE DRAWINGS

Some embodiments of apparatus and/or methods in accordance with embodiments of the disclosure are now described, by way of example only, and with reference to the accompanying drawings, in which.

DETAILED DESCRIPTION

The description and drawings merely illustrate the principles of various embodiments. It will thus be appreciated that those skilled in the art will be able to devise various arrangements that, although not explicitly described or shown herein, embody the principles herein and in the claims and fall within the spirit and scope of the disclosure. Furthermore, all examples recited herein are principally intended expressly to be only for pedagogical purposes to aid the reader in understanding the principles of the embodiments and the concepts contributed by the inventor to furthering the art, and are to be construed as being without limitation to such specifically recited examples and conditions. Moreover, all statements herein reciting principles, aspects, and embodiments, as well as specific examples thereof, are intended to encompass equivalents thereof.

Some of the abbreviations that are described herein are expanded below for convenience:

ANDSF Access Network Discovery and Selection Function
DDF Distributed Data Framework
HPLMN Home PLMN or Equivalent Home PLMN
HSS Home Subscriber Server
IMS IP Multimedia Subsystem
ePDG Evolved Packet Data Gateway
EAP Extensible Authentication Protocol
FQDN Fully Qualified Domain Name
GPRS General Packet Radio Service
GTP GPRS Tunneling Protocol
HPLMN Home Public Land Mobile Network
IMSI International Mobile Subscriber Identity
IMEI International Mobile Equipment Identity
MCM Multi-Connection Mode
MIP Mobile IP
PDN Packet Data Network
PLMN Public Land Mobile Network
PMIP Proxy Mobile IP
PSS Packet Switched Service
SCM Single-Connection Mode
TWAN Trusted WLAN Access Network
TWAG Trusted Wireless Access Gateway
UE User Equipment
UICC Universal Integrated Circuit Card
VPLMN Visited PLMN One or more embodiments are described herein that provide a system and method for providing network services to unauthenticated user equipment. For example, various methods are described for session establishment for an unauthenticated UE in a trusted non-3GPP access network.

Figure 1:
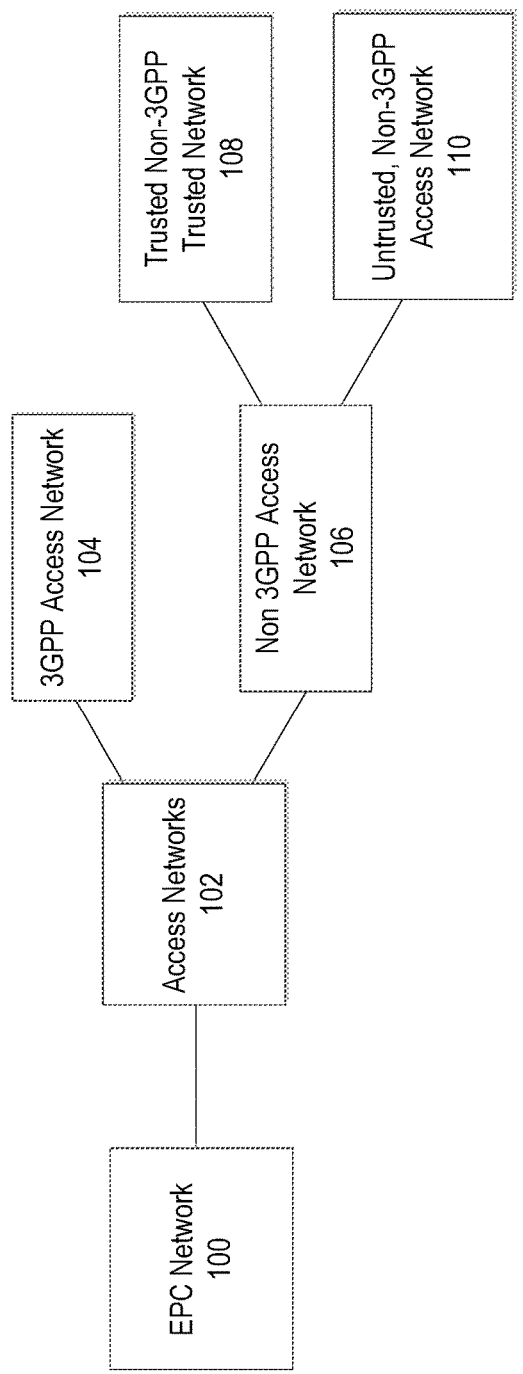
FIG. 1 illustrates a schematic block diagram of an embodiment of types of access networks for an evolved packet core.

FIG. 1 illustrates a schematic block diagram of an embodiment of types of access networks for an evolved packet core. An evolved packet core (EPC) network 100 is fully or partially compliant with the 3rd Generation Partnership Project (3GPP) set of standards or other type of internet protocol (IP) data packet core network standards. The 3GPP set of standards include any of the specifications promulgated by the 3GPP. The EPC network 100 is communicatively coupled to one or more access networks 102. In an embodiment, the access networks 102 may include one or more 3GPP access networks 104 or one or more non-3GPP access networks 106. The 3GPP access networks 104 are wholly or partially compliant with technologies specified by the 3GPP set of standards and include, e.g. GPRS, UMTS, EDGE, HSPA, LTE and LTE Advanced. The non-3GPP access networks 106 are wholly or partially compliant with technologies that are not specified by the 3GPP set of standards. The non-3GPP access networks 106 may be so specified in the 3GPP set of standards. The non-3GPP access networks 106 may include one or more non-3GPP trusted access networks 108 or one or more non-3GPP, non-trusted access networks 110.

The trusted non-3GPP access networks 108 are operator-built or operator supported wireless local area networks (WLAN), such as an IEEE 802.11x compliant WLAN network, with encryption and a secure authentication method. In one embodiment, the trusted, non-3GPP access network 108 supports the following example features: 802.1x-based authentication which in turn also requires encryption of the radio access network (RAN), 3GPP-based network access using EAP method for authentication, and IPv4 and/or IPv6 protocols. However, an operator may determine that other types of non-3GPP access networks with different types of security are to be considered trusted. The untrusted non-3GPP access networks 110 include non-3GPP access networks that are unknown to an operator or do to not include supported authentication standards.

Figure 2:
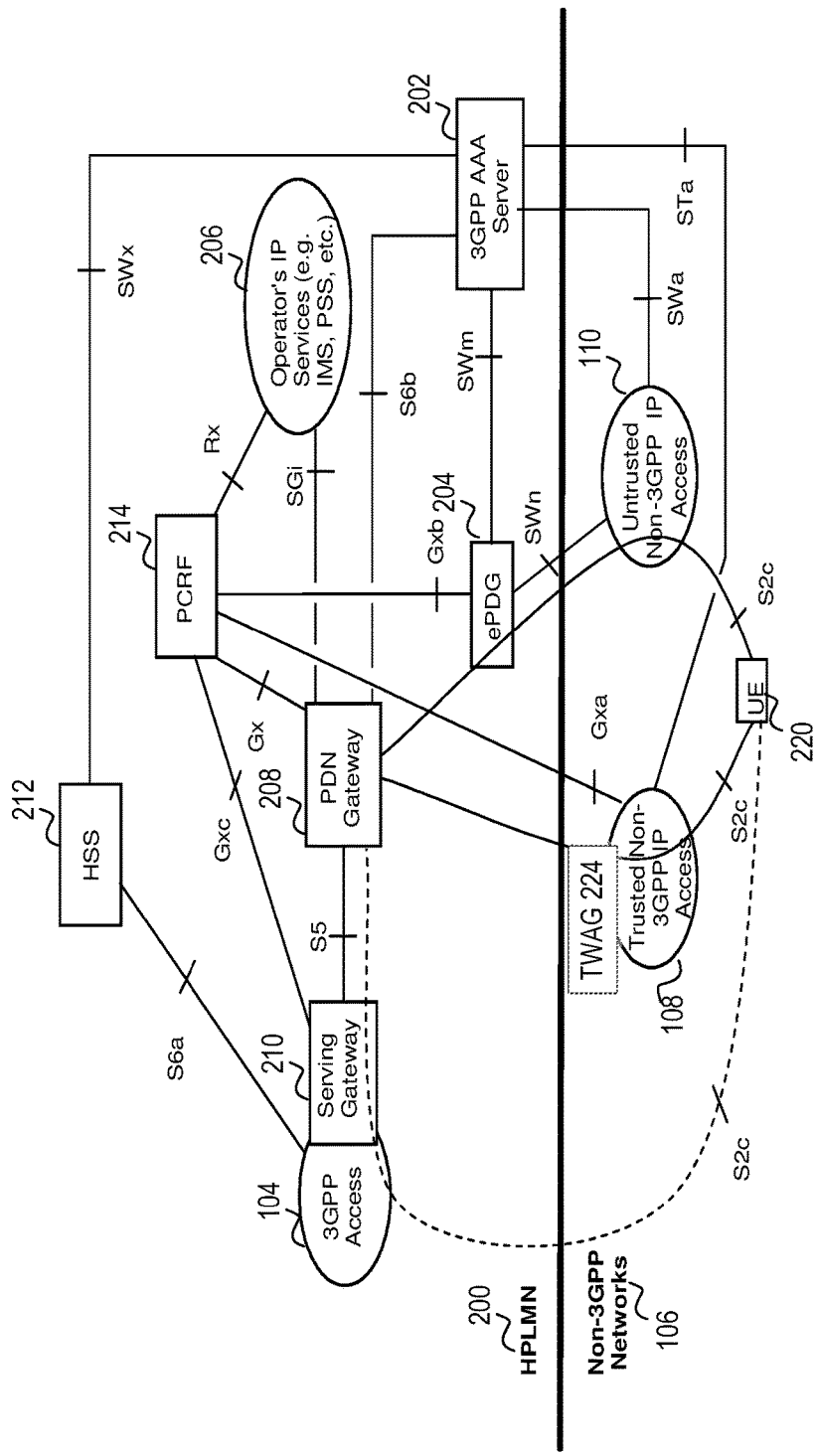
FIG. 2 illustrates a schematic block diagram of an embodiment of non-roaming access to the EPC network via non-3GPP access networks.

FIG. 2 illustrates a schematic block diagram of an embodiment of non-roaming access to the EPC network 100 via non-3GPP access networks 106. This architecture is described in more detail in the technical standard 3GPP TS 23.402 V14.2.0 (December 2016) entitled, "3rd Generation Partnership Project; Technical Specification Group Services and System Aspects; Architecture enhancements for non-3GPP accesses," which is hereby incorporated by reference herein.

The EPC network 100 includes a Home Public Land Mobile Network or Equivalent Home PLMN (HPLMN) 200. A 3GPP authentication, authorization and accounting (AAA) server 202 provides authentication, authorization, policy control and routing information to packet gateways. The 3GPP AAA server 202 performs authentication of UE 220 and provides a seamless and secure access to the EPC network 100. The AAA server 202 includes, for example, a network interface to the other 3GPP network components and to the non-3GPP compliant access networks 106, and a processing device configured for performing one or more functions described herein.

A Trusted Wireless Access Gateway (TWAG) 224 may be included within the non-3GPP trusted access network 108. The TWAG 224 may then establish a direct connection with the Packet Gateway (ePDG) 204 in the HPLMN 200 of the EPC network 100 through a secure tunnel (GTP, MIP or PMIP). A similar process may also used in non-EPC 3G core networks wherein a Wireless Access Gateway (WAG) is connected with the GGSN through a secure GTP tunnel.

The Home Subscriber Server (HSS) 212 is a database that stores user-related and subscriber-related information. It also provides support functions in mobility management, call and session setup, user authentication and access authorization. A serving gateway 210 provides access to a packet data network (PDN) gateway 208. The PDN gateway 208 provides access to a packet network, Internet and operator's IP services 206 (e.g., IMS, PSS, etc.). An evolved packet data gateway (ePDG) 204 provides access to the EPC 100. The UE 220 needs to discover the ePDG 204. Based on operator preference, either static ePDG IP addresses or a fully qualified domain name (FQDN) can be configured on UE 220. Typically FQDN is implemented, such that the ePDG IP address needs to be resolvable within the public Internet. The DNS query is done on the WLAN Internet connection using configured Public DNS IP Address. The UE 220 uses the same ePDG 204 as long as it is reachable. If the connectivity is lost, the UE 220 starts using another ePDG IP address (either configured or provided by the DNS). The policy and charging rules function (PCRF) 214 is a node designated to determine policy rules in the EPC network 100.

Figure 3A:
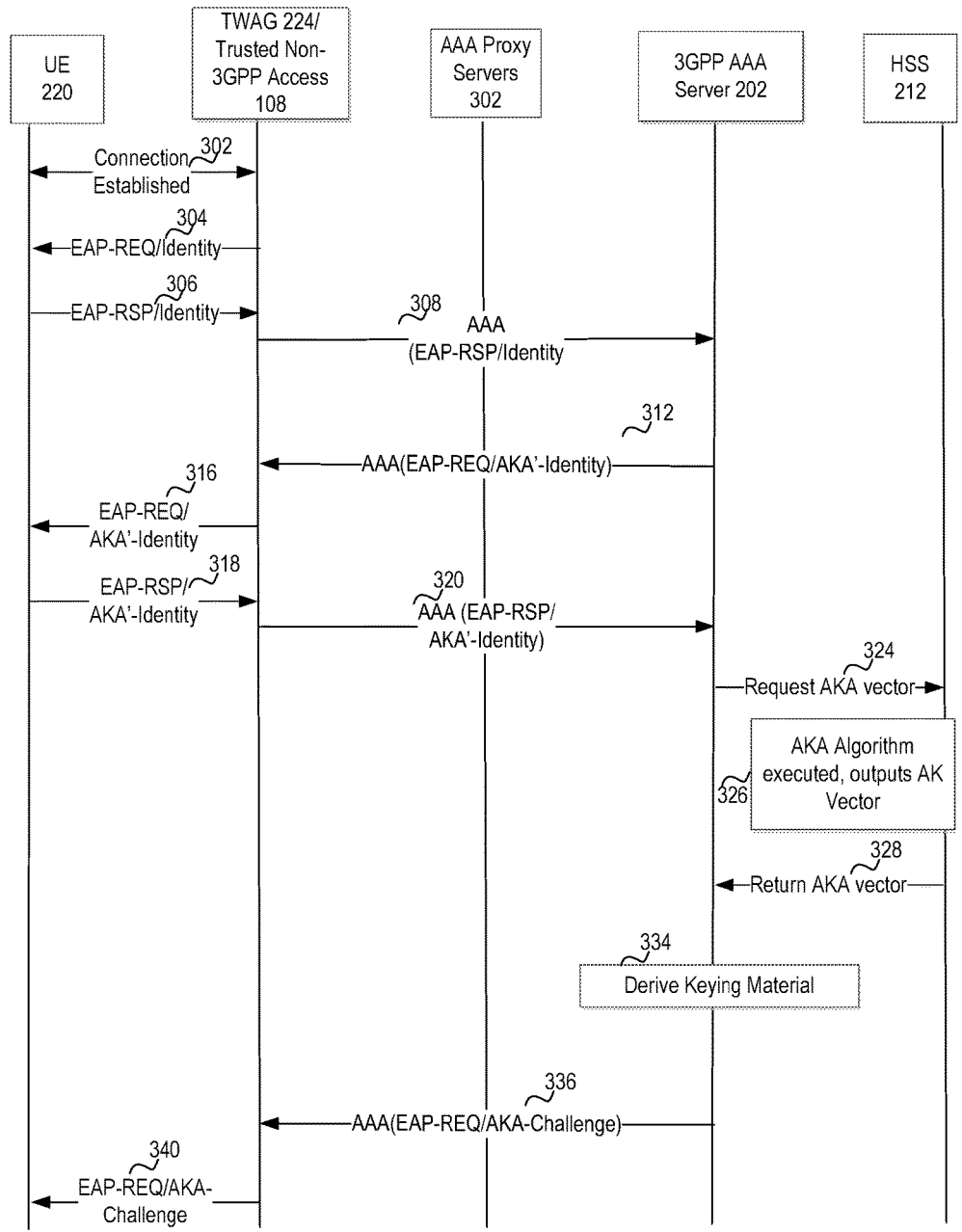
FIG. 3A illustrates a logical flow diagram of an embodiment of a method for authentication of a UE in a trusted non-3GPP access network.
Figure 3B:
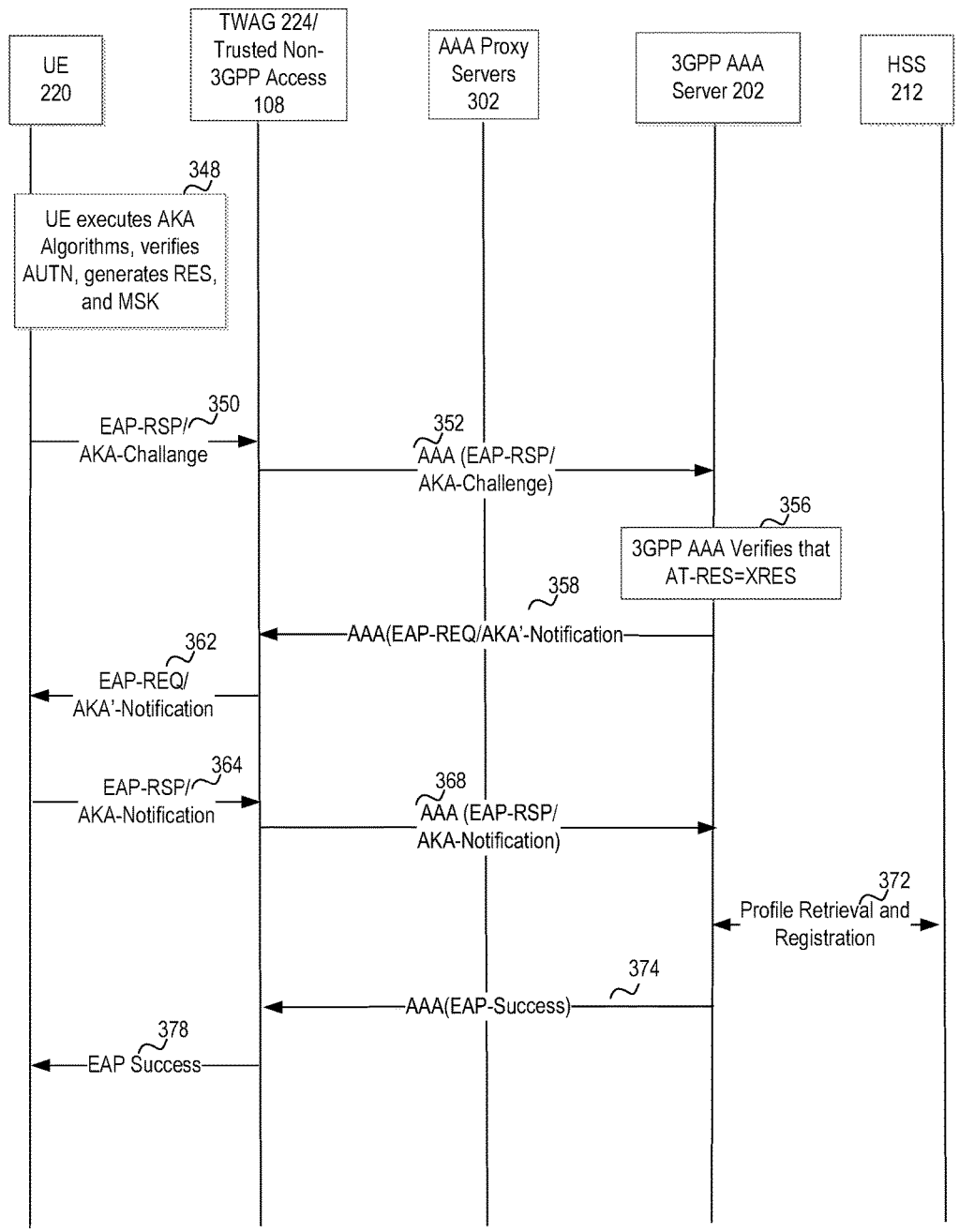
FIG. 3B illustrates a logical flow diagram of an embodiment of a method for authentication of a UE in a trusted non-3GPP access.

FIG. 3A and FIG. 3B illustrate a logical flow diagram of an embodiment of a method 300 for authentication of a UE 220 in a trusted non-3GPP access 108. This procedure is described in more detail in the technical standard 3GPP TS 33.402 V14.0.0 (December 2016) entitled, "3rd Generation Partnership Project; Technical Specification Group Services and System Aspects; 3GPP System Architecture Evolution (SAE); Security aspects of non-3GPP accesses," which is hereby incorporated by reference herein.

A connection is established between the UE 220 and the trusted non-3GPP access network 108, e.g. using a procedure defined by the type of non-3GPP access network, at 302. An authenticator (such as TWAG 224, AP or other node in the access network 108) in the trusted non-3GPP access network 108 transmits an EAP Request/Identity (EAP-REQ/Identity) message to the UE 220 at 304. AN EAP Request/Identity message is defined in IETF RFC 3748 "Extensible Authentication Protocol (EAP)", which is incorporated by reference herein. EAP is a procedure employed to select a specific authentication mechanism, typically after the authenticator requests more information in order to determine a specific authentication method to be used. The EAP packets are transported over the access network using a protocol defined by the type of access network.

The UE 220 transmits an EAP Response/Identity (EAP-RSP/Identity) message at 306. The UE 220 transmits its identity complying with a Network Access Identifier (NAI) format. The NAI includes either a pseudonym allocated to the UE 220 in a previous authentication procedure or, in the case of first authentication, the IMSI.

The EAP Response/Identity message AAA(EAP-RSP-Identity) is routed towards the designated AAA server 202 based on the NAI. The routing path may include one or more AAA proxy servers 302. The access type and the identity of the access network in which the authenticator resides, is included in the message. In the case of roaming, the visited network AAA proxy server also includes the visited network identifier in the same message. The access network identity is defined separately for each access network type.

The AAA server 202 receives the EAP Response/Identity message at 310, wherein the message contains the subscriber identity and the access type. In the case of roaming, the AAA server 202 also receives the visited network identifier in the same message that carried the EAP Response/Identity message.

The AAA server 202 requests again the user identity, using an EAP Request/AKA' Identity message, at 312. This identity request is performed as the intermediate nodes may have changed or replaced the user identity received in the EAP Response Identity message. However, in order to avoid this new request of the user identity, the home operator may ensure that the Authenticator (such as TWAG 224) and all AAA entities between the EAP peer and EAP server process the EAP-Response/Identity message inline with the EAP-AKA' message. Consequently, if the EAP server determines that the EAP-Response/Identity message was processed accordingly, the EAP server shall use the user identity which was received in the EAP-Response/Identity message and omit this EAP Request/AKA' Identity request.

The authenticator in the access network 108 forwards the EAP Request/AKA' Identity message to the UE 220 at 316. The UE 220 responds with an identity that depends on the parameters contained in the EAP Request/AKA' Identity message at 318.

The authenticator in the access network 108 forwards the EAP Response/AKA' Identity to the AAA server 202 at 320. The access type and the identity of the access network in which the authenticator resides, shall be included by the authenticator in this message. In the case of roaming, the visited network AAA proxy shall also include the visited network identifier in the same message. The identity received in this message will be used by the AAA server 202 in the rest of the authentication process.

The AAA server 202 then identifies the subscriber as a candidate for authentication with EAP-AKA', based on the received identity in the EAP-Response/Identity or EAP Response/AKA' Identity message. If the leading digits in the NAI do not indicate that the UE 220 supports EAP-AKA', the 3GPP AAA server shall abort the authentication. If the UE 220 does indicate that it supports EAP-AKA', the AAA server 202 then determines whether it has an unused authentication vector available for that subscriber. If not, a set of new authentication vectors is retrieved from HSS 212 at 324. The AAA server 202 includes an indication that the authentication vector is for EAP-AKA', as defined in IETF RFC 5448, "Improved Extensible Authentication Protocol Method for 3$^{rd}$ Generation Authentication and Key Agreement (EAP-AKA')", dated May 2009 and incorporated by reference herein. The identity of the access network in which the authenticator resides in the message is also transmitted to the HSS 212.

A mapping from the temporary identifier to the IMSI is required, or a pseudonym as described in IETF RFC 4187, "Extensible Authentication Protocol Method for 3rd Generation Authentication and Key Agreement (EAP-AKA)," dated January 2006 and incorporated by reference herein. As the UE 220 moves, the access network identifier may change. But an authentication vector stored in the AAA server 202 may only be used when it is associated with the access network identifier of the current access network. This may make stored authentication vectors unusable. Furthermore, as the AAA server 202 resides in the home network, there is no significant performance advantage in fetching batches of authentication vectors. Therefore, the AAA server 202 may determine to fetch only one authentication vector at a time rather than in batches.

Upon receiving from the AAA server 202 an indication that the authentication vector is for EAP-AKA', the HSS 212 then obtains an authentication AK vector. The HSS 212 then transforms this authentication vector into a new authentication AK vector by executing an Authentication and Key Agreement (AKA) algorithm (e.g., computing CK' and IK'). The HSS then transmits this transformed authentication vector to the AAA server 202 at 328. The AAA server 202 does not process the transformation and treats this authentication vector similar to other authentication vectors. The HSS 212 and/or AAA server 202 may also determine, based on local policy, that the non-3GPP access requesting the authentication data is authorized to use the access network identity.

The HSS 212 may determine whether there an AAA server 202 is already registered for this subscriber. In case the HSS 212 detects that another AAA server 202 has already registered for this subscriber, it shall provide the current AAA server 202 with the previously registered 3GPP AAA Server address. The authentication signalling is then routed to the previously registered 3GPP AAA Server. The AK vector is transmitted by the HSS 212 to the serving AAA server 202 at 328.

The AAA server 202 derives new keying materials MSK and EMSK from CK' and IK' at 334. EAP defines two types of keying material: a Master Session Key (MSK) and an Extended Master Session Key (EMSK). A new pseudonym and/or re-authentication ID may be chosen and be protected (i.e. encrypted and integrity protected) using keying material generated from EAP-AKA'.

The AAA server 202 transmits RAND, AUTN, a message authentication code (MAC) and two user identities (when generated), protected pseudonym and/or protected re-authentication identity, to the authenticator in the access network 108 in an EAP Request/AKA'-Challenge message (AAA(EAO-REQ/AKA-Challenge) at 336. The AAA server 202 shall also include the access network identity in this message. The authenticator in the access network 108 transmits the EAP Request/AKA'-Challenge message to the UE 220 at 340.

Referring to FIG. 3B, the process continues wherein the UE 220 executes AKA algorithms at 348. The UE 220 verifies that AUTN is correct and authenticates the network. If AUTN is incorrect, the UE 220 rejects the authentication. The UE 220 calculates a new MAC value covering the EAP message with the new keying material. The UE 220 sends EAP Response/AKA'-Challenge message at 350, wherein the message contains calculated RES and the new calculated MAC value to the authenticator in the access network. The authenticator in the access network 108 sends the EAP Response/AKA'-Challenge message to AAA server 202 at 352.

The AAA server 202 checks the received MAC and compares XRES to the received RES. When the comparisons are successful, the 3GPP AAA Server 202 transmits an EAP Request/AKA'-Notification at 358. These steps are conditional based on the EAP server and the UE 220 having indicated the use of protected successful result indications. The authenticator in the access network 108 forwards the message to the UE 220 at 362. The UE 220 sends the EAP Response/AKA'-Notification at 364.

The authenticator in the access network 108 forwards the EAP Response/AKA'-Notification message to the AAA server 202 at 368. The AAA server 202 may ignore the contents of this message. The AAA server 202 shall initiate the Subscriber Profile Retrieval and 3GPP AAA Server registration to the HSS 212 at 372. The AAA server 202 shall keep access session information related to the subscriber including the access network identity. The AAA server 202 shall implement a policy to limit the number of active access sessions. The AAA server 202 sends the EAP Success message to the authenticator in the access network 108 at 374. The authenticator in the access network 108 informs the UE 220 about the successful authentication with the EAP Success message at 378. The EAP AKA' exchange has been successfully completed, and the UE 220 and the authenticator in the access network 108 share keying materials, such as MSK and EMSK, derived during that exchange.

When the authentication process fails, the EAP AKA' process will be terminated and an indication is transmitted to the HSS 212. The authentication process may fail, for example because of unsuccessful checking of MACs or no response from the UE 220 after a network request or other reasons. For example, the UE 220 may not provide required authentication information during the authentication process, or the UE 220 may not be able to proceed with or support the authentication process, or the UE 220 may not have an installed smart card, such as a Universal Integrated Circuit Card (UICC).

Currently, an unauthenticated UE 220 requesting service in a non-3GPP, trusted access network 108 is not allowed to establish a session with the EPC network 100 or gain access to the EPC network services. However, some EPC network services are required to be available to any requesting UE 220, including an unauthenticated UE 220. For example, emergency session establishment is required for any requesting UE 220, including unauthenticated UEs 220. As such, a system and method is needed to support session establishment for an unauthenticated UE 220 in a trusted, non-3GPP access network 108.

In an embodiment, new extensions or procedures to the current EAP defined processes are proposed. A first extension "TWAN-Info-Notification" is added to initiate a connection mode for an unauthenticated UE 220. In this extension, the AAA server 202 signals or communicates to an unauthenticated UE 220 its network connection capability, e.g. whether the AAA server supports Single Connection Mode (SCM) and/or Multiple Connection Mode (MCM) and whether it supports session establishment for emergency services.

For example, when the 3GPP AAA server 202 is configured to accept unauthenticated emergency session over WLAN and IMEI was received or IMSI was received but IMSI authentication cannot proceed, the 3GPP AAA server 202 initiates connection mode negotiation with the UE 220. When the 3GPP AAA server 202 supports SCM, MCM or both, the 3GPP AAA server 202 includes a TWAN connection mode attribute in the EAP-Request message. The 3GPP AAA server 303 includes a CONNECTION_MODE_CAPABILITY item indicating whether the network supports SCM, MCM or any combination of them, and indicating emergency service is supported.

The unauthenticated UE 220 indicates a requested connection mode as either SCM or MCM. When the UE 220 selects SCM mode, the UE 220 communicates requested connection parameters, such as PDN type (IPv4, IPv6, or IPv4v6) and Protocol configuration options (PCOs). When the UE selects MCM mode, the AAA server 202 communicates an IP address of a trusted wireless access gateway (TWAG_IP_addr).

For example, in a second extension, a "TWAN-Conn-Notification" field is added to confirm the session establishment and connection parameters. The AAA server 202 confirms the connection establishment request for the selected connection mode (SCM or MCM) and signals the selected connection parameters when SCM mode is requested. For example, the AAA server communicates confirmed connection parameters, such as PDN type (IPv4, IPv6, or IPv4v6) and PCO (Protocol configuration options). When MCM mode is requested by the UE 220, the AAA server 202 uses the TWAN-Conn-Notification extension to communicate a TWAG_IP_Address to the UE 220 to allow the UE 220 to establish connection with a TWAG in the access network via a Wireless LAN control plane (WLCP) protocol. The UE 220 then acknowledges completion of the connection mode and connection parameter negotiation.

Figure 4:
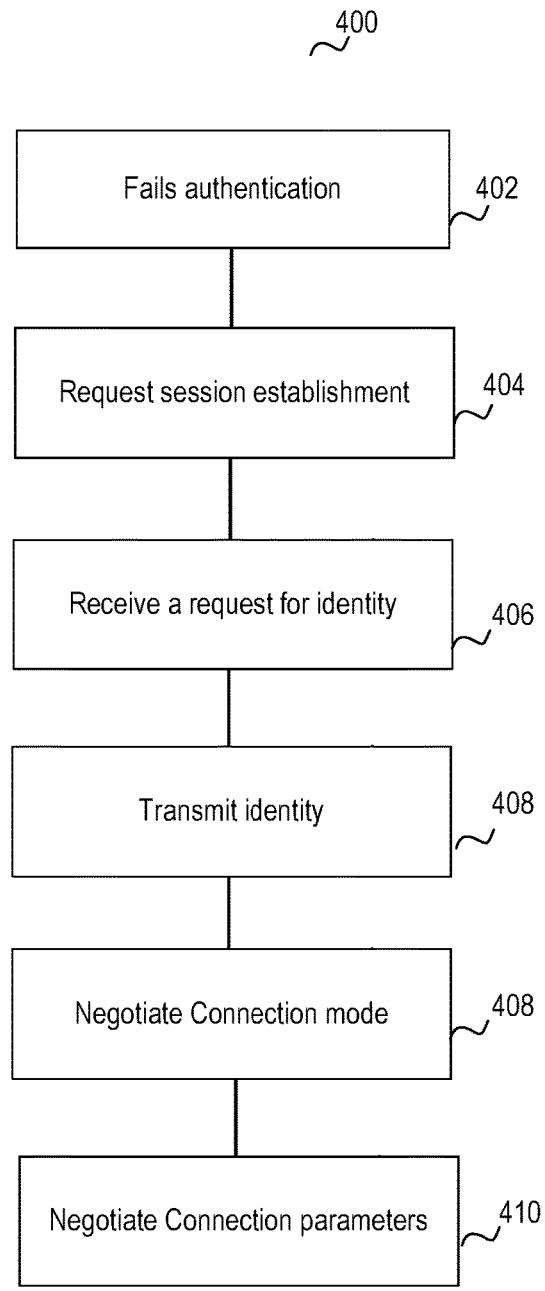
FIG. 4 illustrates a logical flow diagram of an embodiment of a method 400 for an unauthenticated UE in a trusted non-3GPP access network to request network services using EAP extensions.

FIG. 4 illustrates a logical flow diagram of an embodiment of a method 400 for an unauthenticated UE 220 in a trusted non-3GPP access network 108 to request network services using EAP extensions. In step 402, the UE 220 fails to receive authentication in a trusted non-3GPP access network 108. The unauthenticated UE 220 then initiates an emergency session via the trusted non-3GPP access network 108 in step 404. The unauthenticated UE 220 receives a request for its identity in 406. For example, the AAA server 202 transmits an EAP Request/Identity message requesting an IMEI from the unauthenticated UE 220. The unauthenticated UE 220 transmits an identity at 408, e.g. its IMEI in an EAP Response/Identity message. The IMEI or International Mobile Equipment Identity is a number, usually unique, to identify user equipment. The IMEI number is generally used by the network to identify valid devices and has no permanent or semi-permanent relation to the subscriber.

The unauthenticated UE 220 then negotiates a connection mode using a first EAP extension "TWAN-Info-Notification" process in 408. For example, unauthenticated UE 220 receives an EAP-Request/TWAN-Info-Notification to negotiate a connection mode (SCM or MCM). The unauthenticated UE 220 then negotiates connection parameters at 410. For example, the UE 220 uses the second extension EAP-Request/TWAN-Conn-Notification to establish connection parameters. In an embodiment, when both the UE 220 and the network support MCM mode, the UE 220 requests MCM mode and connection parameters are passed to the TWAG 224 using a Wireless LAN control plane (WLCP) protocol for trusted WLAN access to the EPC network 100. When the UE 220 requests SCM mode, the UE 220 provides an APN and PDN type in the EAP-Response/TWAN-Info-Notification message.

Figure 5:
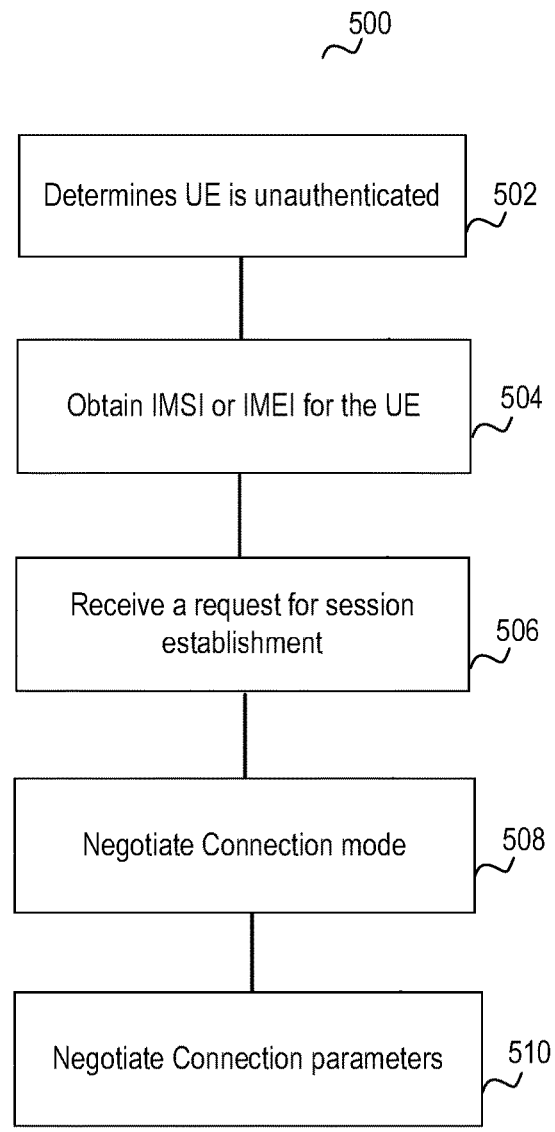
FIG. 5 illustrates a logical flow diagram of an embodiment of a method for session establishment by an AAA server with an unauthenticated UE.

FIG. 5 illustrates a logical flow diagram of an embodiment of a method 500 for session establishment by an AAA server 202 with an unauthenticated UE 220. When the AAA Server 202 determines that authentication can proceed, the AAA server 202 invokes established EAP protocols for session establishment. However, the AAA server may determine that the UE 220 is unauthenticated or may not be authenticated in step 502. For example, the AAA server 202 receives an IMSI from the UE 220 but authentication cannot proceed or the IMSI authentication has failed or the AAA server 202 otherwise cannot determine an authentication of the UE 220.

When the AAA server 202 is configured to accept unauthenticated emergency session over a non-3GPP, trusted access network 108, such as a WLAN, the AAA server 202 obtains the IMEI for the unauthenticated UE 220 at 504. For example, the AAA server 202 transmits an EAP Request/Identity message to obtain an IMEI from the UE 220, and receives an EAP Response/Identity message with the requested IMEI from the UE 220.

The AAA server 202 then negotiates a connection mode (SCM or MCM) at 508 and connection parameters with the UE 220 at step 510. For example, the AAA server 202 employs the EAP-Request/TWAN-Info-Notification, EAP-Response/TWAN-Info-Notification, EAP-Request/TWAN-Conn-Notification and EAP-Response/TWAN-Conn-Notification messages to negotiate the connection mode and parameters. The network indicates to the UE 220 the supported connection modes (SCM or MCM) using an EAP-Request/TWAN-Info-Notification message.

Various embodiments of EAP packet formats are implemented for the EAP-Request/TWAN-Info-Notification messages, EAP-Response/TWAN-Info-Notification messages, EAP-Request/TWAN-Conn-Notification messages and EAP-Response/TWAN-Conn-Notification messages. Embodiments of such EAP packets formats are illustrated in FIGS. 6-9 herein.

Figure 6:
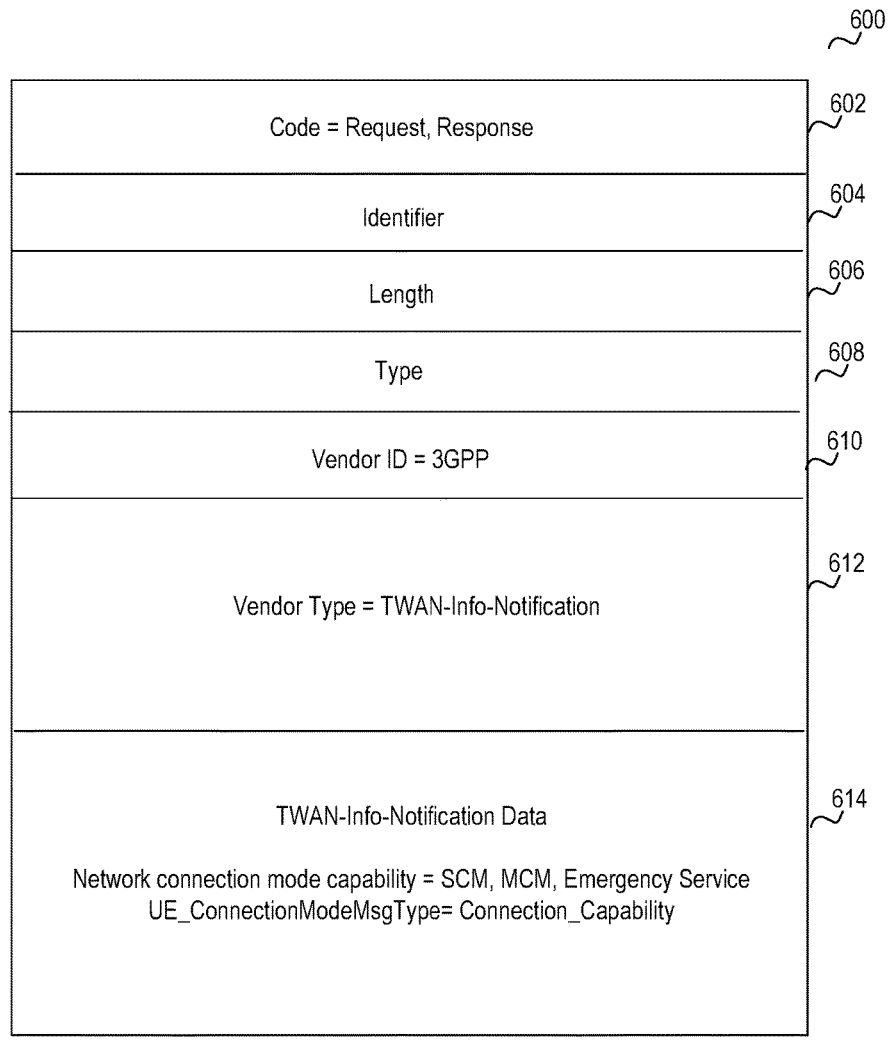
FIG. 6 illustrates a schematic block diagram of an embodiment of an EAP packet format with expanded types for implementing a TWAN-Info-Notification message from the EPC network to an unauthenticated UE.

FIG. 6 illustrates a schematic block diagram of an embodiment of an EAP packet format 600 with expanded types for implementing a TWAN-Info-Notification message from the EPC network 100 to an unauthenticated UE 220. The packet format includes fields for a code 602 to indicate a request or response message, an identifier field 604, length field 606, type field 608 and vender ID field 610. The EAP packet further includes a vendor type 612 with a designation "TWAN-Info-Notification." The EAP packet further includes a TWAN-Info-Notification Data field 614. The TWAN-Info-Notification Data field 614 may include a Network connection mode capability, such as SCM, MCM or Emergency Service. The TWAN-Info-Notification Data field 614 may further include a UE connection Mode Message Type (UE_ConnectionModeMsgType) with Connection Capability data.

Figure 7:
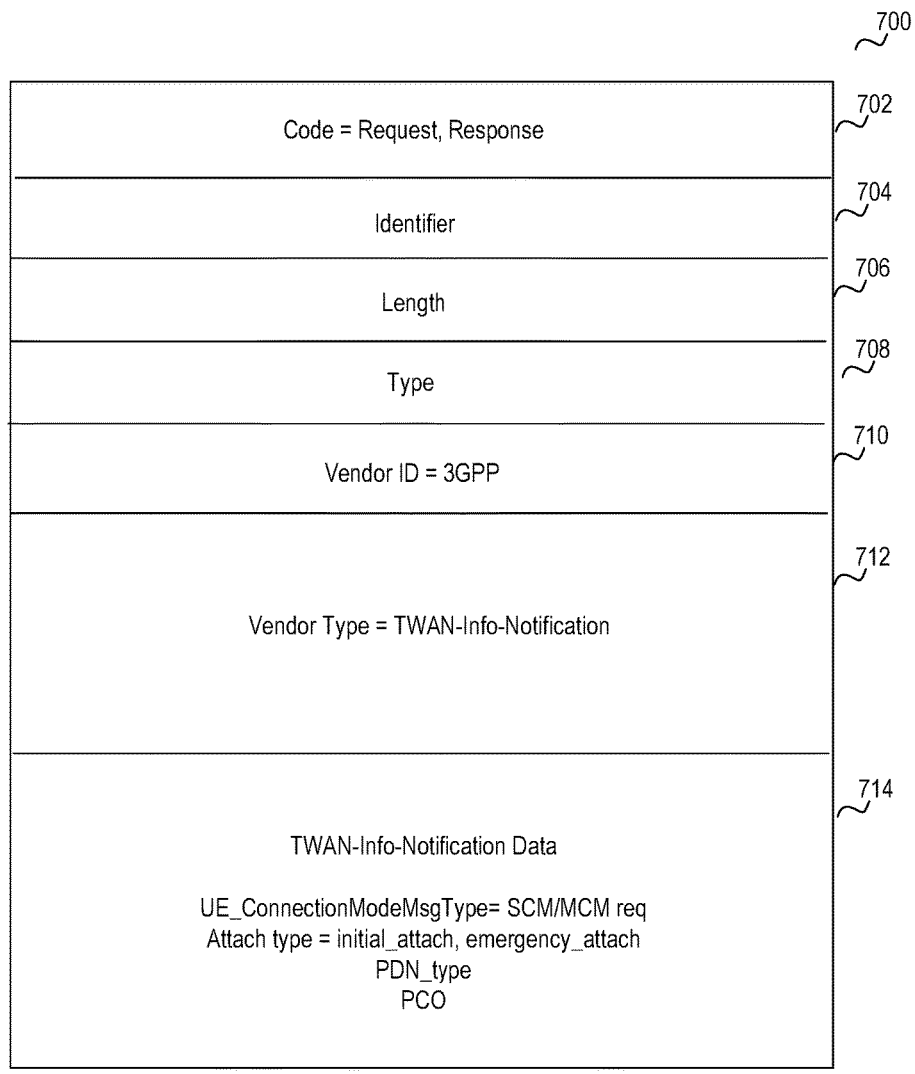
FIG. 7 illustrates a schematic block diagram of an embodiment of an EAP packet format with expanded types for implementing a TWAN-Info-Notification message from an unauthenticated UE to the EPC network.

FIG. 7 illustrates a schematic block diagram of an embodiment of an EAP packet format 700 with expanded types for implementing a TWAN-Info-Notification message from an unauthenticated UE 220 to the EPC network 100. The packet format includes fields for a code 702 to indicate a request or response message, an identifier field 704, length field 706, type field 708 and vender ID field 710. The EAP packet further includes a vendor type 712 with a designation "TWAN-Info-Notification." The EAP packet further includes a TWAN-Info-Notification Data field 714. The TWAN-Info-Notification Data field 714 may include a UE connection mode message type field that indicates whether the UE 220 requests SCM or MCM connection mode. The TWAN-Info-Notification Data field 714 may further include an attach type field that indicates whether the UE 220 requests an initial attachment or emergency attachment. The TWAN-Info-Notification Data field 714 may further include PDN types and PCOs supported by the UE 220.

Figure 8:
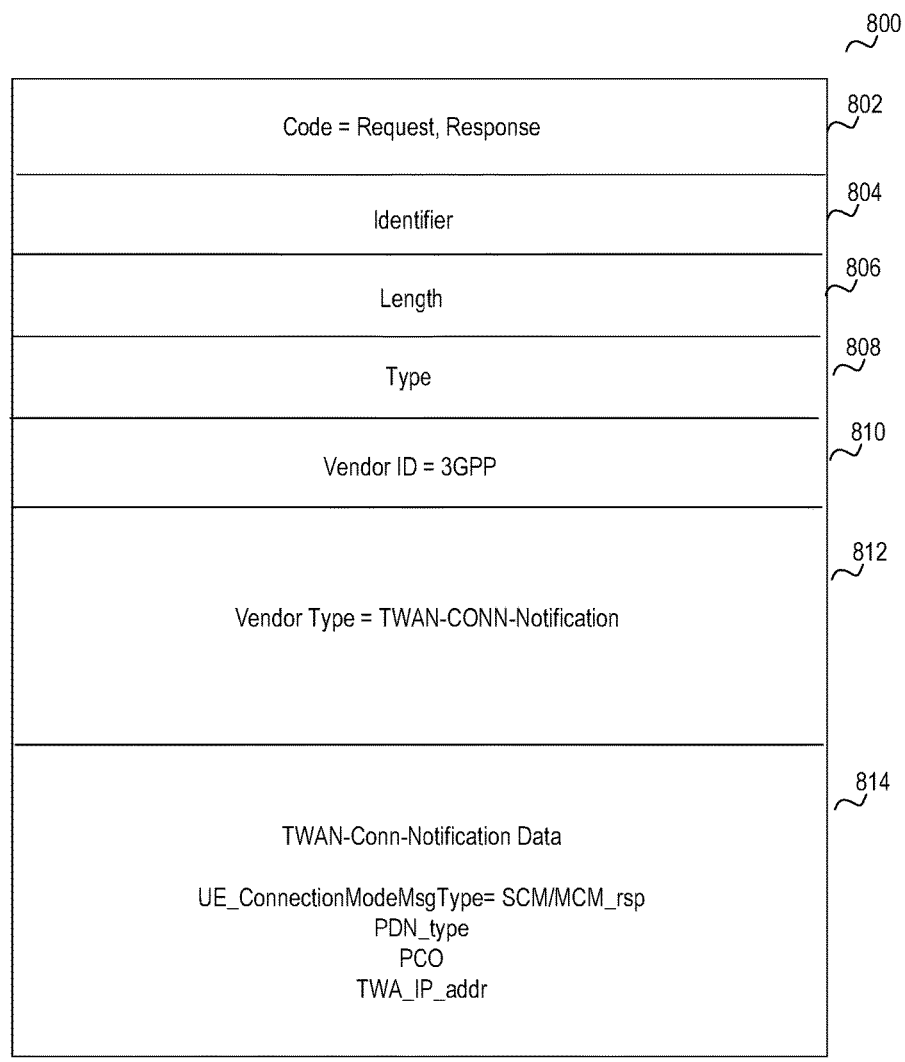
FIG. 8 illustrates a schematic block diagram of an embodiment of an EAP packet format with expanded types for implementing a TWAN-CONN-Notification message from the EPC network to an unauthenticated UE.

FIG. 8 illustrates a schematic block diagram of an embodiment of an EAP packet format 800 with expanded types for implementing a TWAN-CONN-Notification message from the EPC network 100 to an unauthenticated UE 220. The packet format includes fields for a code 802 to indicate a request or response message, an identifier field 804, a length field 806, type field 808 and a vender ID field 810. The EAP packet further includes a vendor type 812 with a designation "TWAN-Conn-Notification." The EAP packet further includes a TWAN-Conn-Notification Data field 814. The TWAN-Conn-Notification Data field 814 may include a UE Connection Mode Message Type (UE_ConnectionModeMsgType) with a response of the connection type, such as SCM or MCM. The TWAN-Info-Notification Data field 814 may further include PDN types and PCOs for the connection. The TWAN-Info-Notification Data field 814 may further include an IP address for a trusted wireless access gateway to be used for the connection (TWAG_IP_addr).

Figure 9:
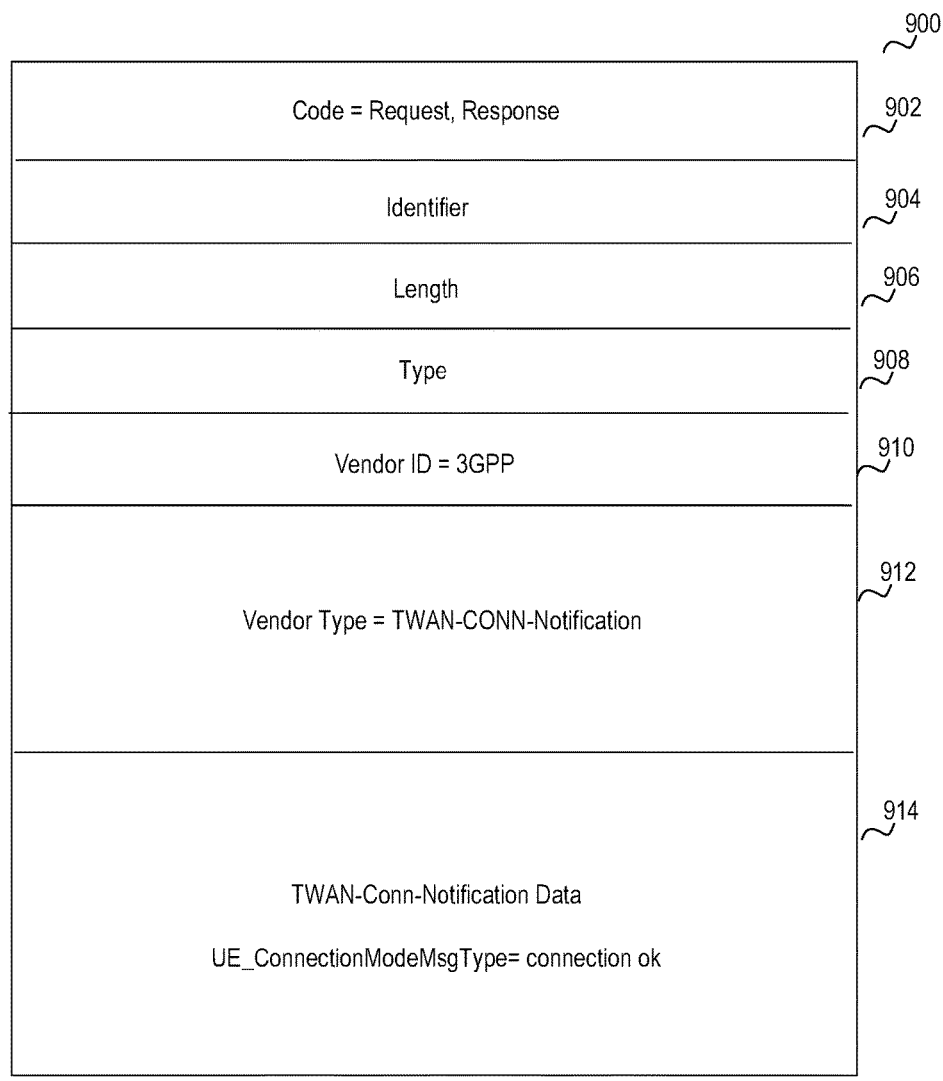
FIG. 9 illustrates a schematic block diagram of an embodiment of an EAP packet format with expanded types for implementing a TWAN-CONN-Notification message from an unauthenticated UE to a network.

FIG. 9 illustrates a schematic block diagram of an embodiment of an EAP packet format 900 with expanded types for implementing a TWAN-CONN-Notification message from an unauthenticated UE 220 to a network. The packet format includes fields for a code 902 to indicate a request or response message, an identifier field 904, a length field 906, type field 908 and a vender ID field 910. The EAP packet further includes a vendor type 912 with a designation "TWAN-Conn-Notification." The EAP packet further includes a TWAN-Conn-Notification Data field 914. The TWAN-Conn-Notification Data field 814 may include a UE Connection Mode Message Type (UE_ConnectionModeMsgType) indicating the connection type is acceptable.

As shown in FIGS. 6-9, the UE connection mode message types (ConnectionModeMSGType) in the EAP packets include for example: CONNECTION_CAPABILITY, SCM_ REQUEST, SCM_RESPONSE, MCM_REQUEST, MCM_RESPONSE, CONNECTION_OK. The network_connection_mode_capability types (network_connection_mode_capability) include for example: SCM support, MCM support and Emergency services support.

When the unauthenticated UE 220 and the AAA server 202 have negotiated a connection mode and parameters, the AAA Server 202 generates an MSK based on the IMEI of the UE 220 and transmits a final Authentication and Authorization Answer (with a result code indicating success) including an EAP Success message and the MSK key material to the TWAG 224 in the access network 108. A Permanent User Identity IE field in the Authentication and Authorization Answer contains the IMEI of the UE. The TWAG sends the EAP Success message to the UE 220 and stores the MSK key material.

The UE 220 generates MSK based on its IMEI. The UE 220 and the authenticator in the access network share MSK keying material. The SCM connection is then established. For establishing an MCM connection, the UE 220 initiates connection establishment using WLCP protocol towards the TWAG 224 in the access network 108 using the TWAG IP address received from AAA server 202.

When the AAA server 202 is not configured to accept unauthenticated emergency sessions over a non-3GPP trusted access network 108, the AAA server 202 rejects the emergency session request and returns an EAP failure message to the UE 220.

Figure 10:
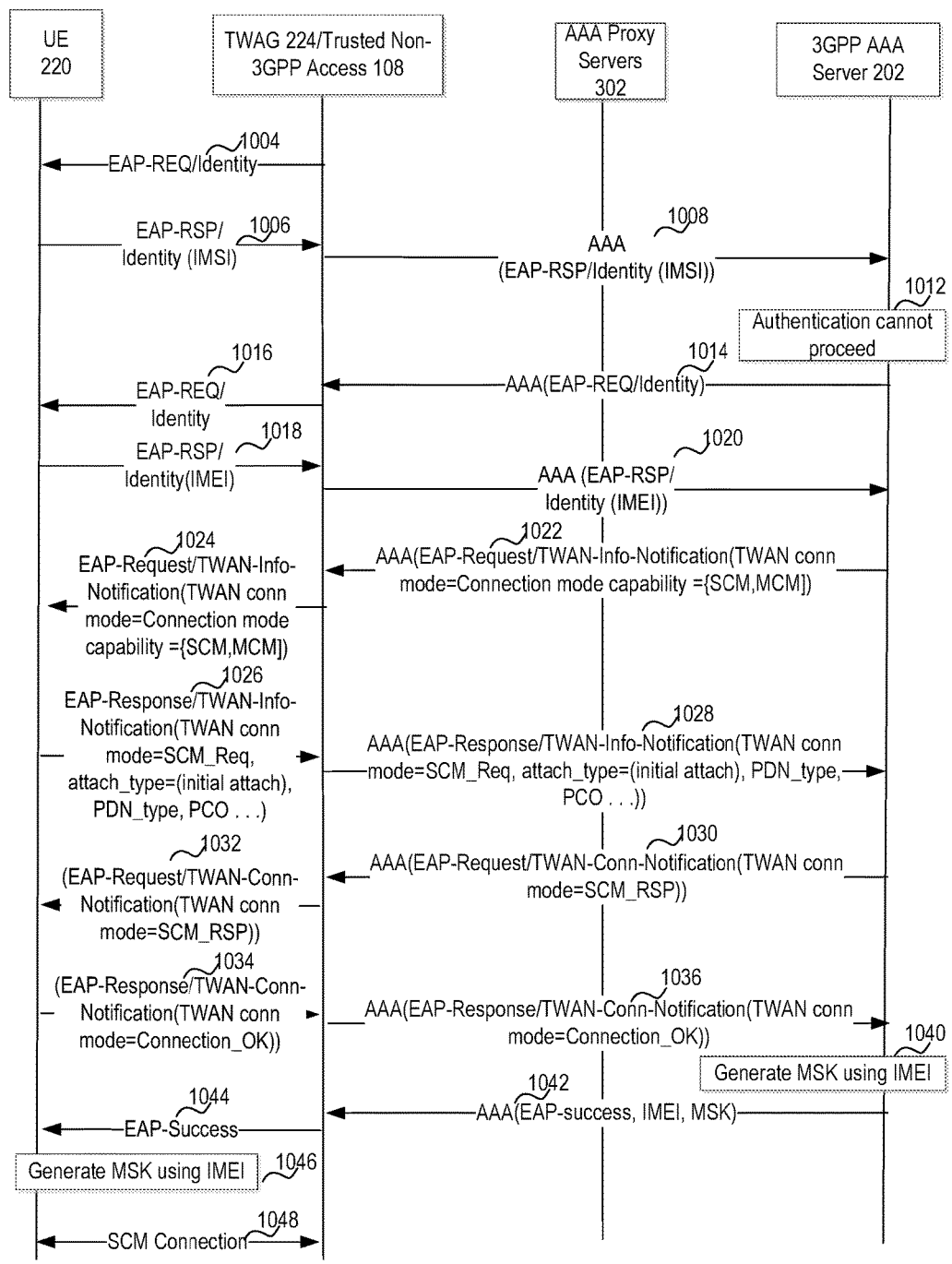
FIG. 10 illustrates a logical flow diagram of an embodiment of a method for support of general service access by an unauthenticated UE.

FIG. 10 illustrates a logical flow diagram of an embodiment of a method 1000 for support of general service access by an unauthenticated UE 220. An unauthenticated UE 220 may request session establishment for network services other than emergency services. FIG. 10 illustrates an example wherein the unauthenticated UE 220 requests a SCM type connection mode via a non-3GPP trusted access network 108, such as a trusted WLAN access network.

The TWAG 224, AP or other authenticator in the trusted non-3GPP access network 108 transmits an EAP message of identity request (EAP-REQ/Identity) to the UE 220 at 1004. In this embodiment, the UE 220 provides an IMSI to the AAA server 202 in an EAP message with of an identity response (EAP-RSP/Identity) at 1006. The TWAG 224 forwards the AAA(EAP-RSP/Identity) message with the IMSI of the UE to the AAA server 202 at 1008. An optional proxy server may reside between the AAA server and the unauthenticated UE 220 for relaying the messages.

The AAA server 202 determines that authentication cannot proceed at 1012 and requests further identification at 1014 in an AAA(EAP-REQ/Identity) message to the TWAG 224 at 1014. The EAP-REQ/Identity message is transmitted to the UE 220 over the access network 108 at 1016. The UE 220 responds with an IMEI to the AAA server 202 in an EAP message with an identity response (EAP-RSP/Identity) at 1018. The TWAG 224 forwards an AAA(EAP-RSP/Identity) message with the IMEI to the AAA server 202 at 1020.

The AAA server 202 then transmits an EAP packet that includes a TWAN-Info-Notification Data field 614. The TWAN-Info-Notification Data field 614 (TWAN conn mode) that may include a Network connection mode capability, such as SCM, MCM. The TWAN-Info-Notification Data field 614 may further include a UE connection Mode Message Type (UE_ConnectionModeMsgType) with Connection Capability data. The TWAG 224 then transmits the TWAN-Info-Notification Data message to the UE 220 at 1024.

The UE 220 requests a connection mode of SCM in an EAP-Response/TWAN-INFO-Notification message to the AAA server at 1026, which is forwarded by the TWAG 224 to the AAA server 202 at 1028. The TWAN-Info-Notification Data field may further include an attachment type request (initial attach) and PDN type and PCO supported.

The AAA server 202 responds with an EAP-Request/TWAN-CONN-Notification message at 1030 that specifies a TWAN connection mode of SCM (TWAN conn mode is set to SCM_RSP). The Notification message may also include the PDN type supported and also include the protocol configuration options (PCOs). The Notification message is forwarded to the UE 220 by the TWAG at 1034. The UE 220 transmits an EAP-Response/TWAN-CONN-Notification message confirming the connection mode of SCM (TWAN conn mode=Connection_OK) at 1034. The TWAG 224 forwards the message to the AAA server 202 at 1036. The UE 220 and AAA server 202 then complete the SCM connection. For example, the AAA server 202 generates an MSK using the IMEI of the UE 220 at 1040. The AAA server 202 transmits an EAP-success message with the IMEI and MSK at 1042, which is forwarded to the UE 220 by the TWAG 224 at 1044. The UE generates the MSK using the IMEI at 1046 and establishes the SCM connection at 1048.

Figure 11:
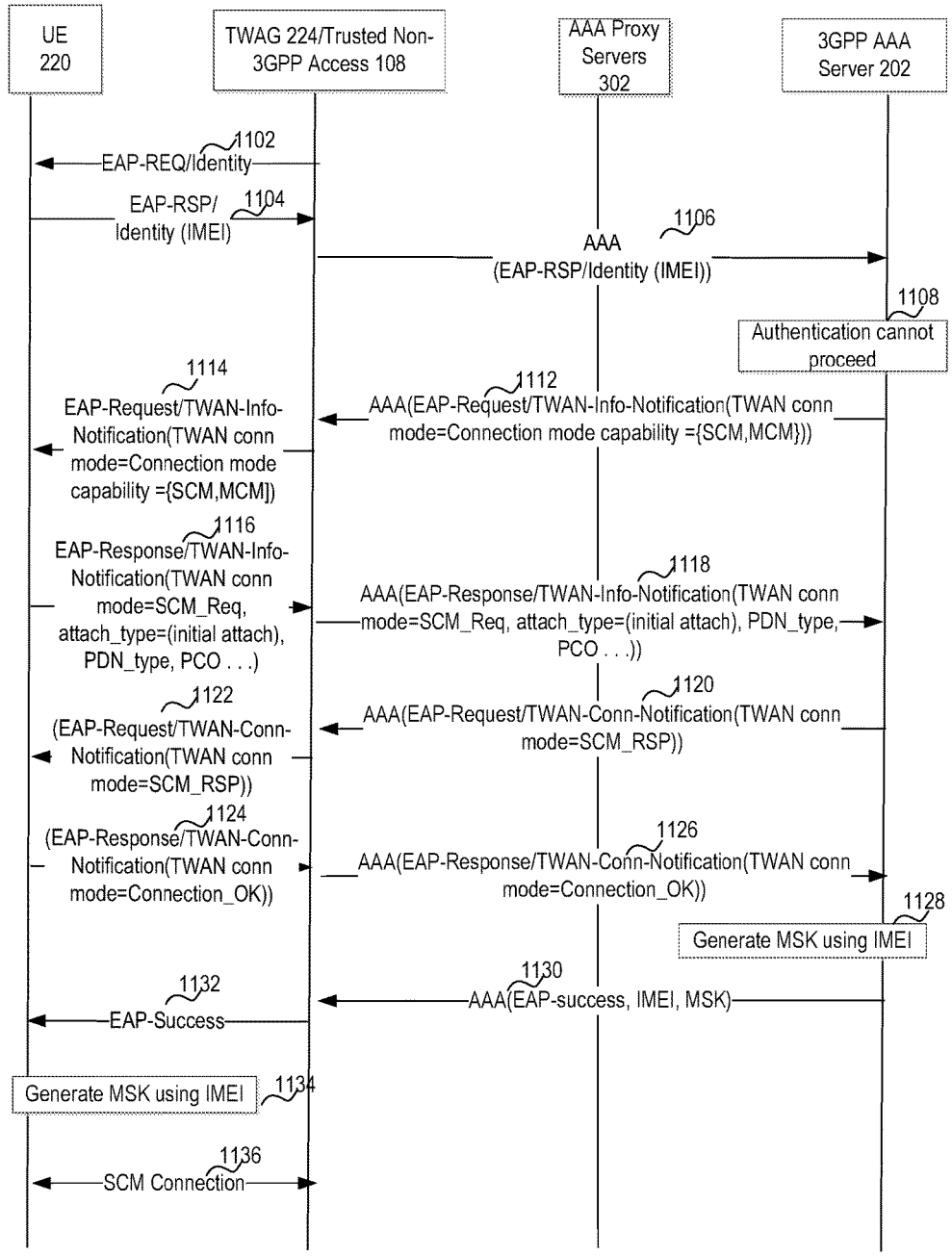
FIG. 11 illustrates a logical flow diagram of an embodiment of a method for support of general service access by an unauthenticated UE.

FIG. 11 illustrates a logical flow diagram of an embodiment of a method for support of general service access by an unauthenticated UE 220. In this embodiment, the unauthenticated UE 220 does not have UICC capabilities, e.g. the UE 220 does not have a UICC, has an inoperable UICC, etc. In this embodiment, the UE 220 does not communicate an IMSI to the AAA server 202 but only an IMEI of the UE. The UE 220 may still request a connection mode of SCM in an EAP-Response/TWAN-INFO-Notification message to the AAA server.

An EAP-REQ/Identity message is transmitted to the UE 220 over the access network 108 at 1102. The UE 220 responds with an IMEI to the AAA server 202 in an EAP message with an identity response (EAP-RSP/Identity) at 1104. The access network 108 forwards an AAA(EAP-RSP/Identity) message with the IMEI to the AAA server 202 at 1106.

The AAA server 202 determines that authentication cannot proceed at 1108. The AAA server 202 then transmits an EAP message that includes a TWAN-Info-Notification Data field at 1112. The TWAN-Info-Notification Data field (TWAN conn mode) that may include a Network connection mode capability, such as SCM, MCM. The TWAN-Info-Notification Data field may further include a UE connection Mode Message Type (UE_ConnectionModeMsgType) with Connection Capability data. The TWAG 224 then transmits the TWAN-Info-Notification Data message to the UE 220 at 1114.

The UE 220 requests a connection mode of SCM in an EAP-Response/TWAN-INFO-Notification message to the AAA server at 1116, which is forwarded by the TWAG 224 to the AAA server 202 at 1118. The TWAN-Info-Notification Data field may further include an attachment type request (initial attach) and PDN type and PCO supported.

The AAA server 202 responds with an EAP-Request/TWAN-CONN-Notification message at 1120 that specifies a TWAN connection mode of SCM (TWAN conn mode=SCM_RSP) that is forwarded to the UE 220 by the TWAG at 1122. The UE 220 transmits an EAP-Response/TWAN-CONN-Notification message confirming the connection mode of SCM (TWAN conn mode=Connection_OK) at 1124. The TWAG 224 forwards the message to the AAA server 202 at 1126. The UE 220 and AAA server 202 then complete the SCM connection. For example, the AAA server 202 generates an MSK using the IMEI of the UE 220 at 1128. The AAA server 202 transmits an EAP-success message with the IMEI and MSK at 1130, which is forwarded to the UE 220 by the TWAG 224 at 1132. The UE generates the MSK using the IMEI at 1046 and establishes the SCM connection at 1134. The UE 220 then establishes the SCM connection at 1136.

Figure 12:
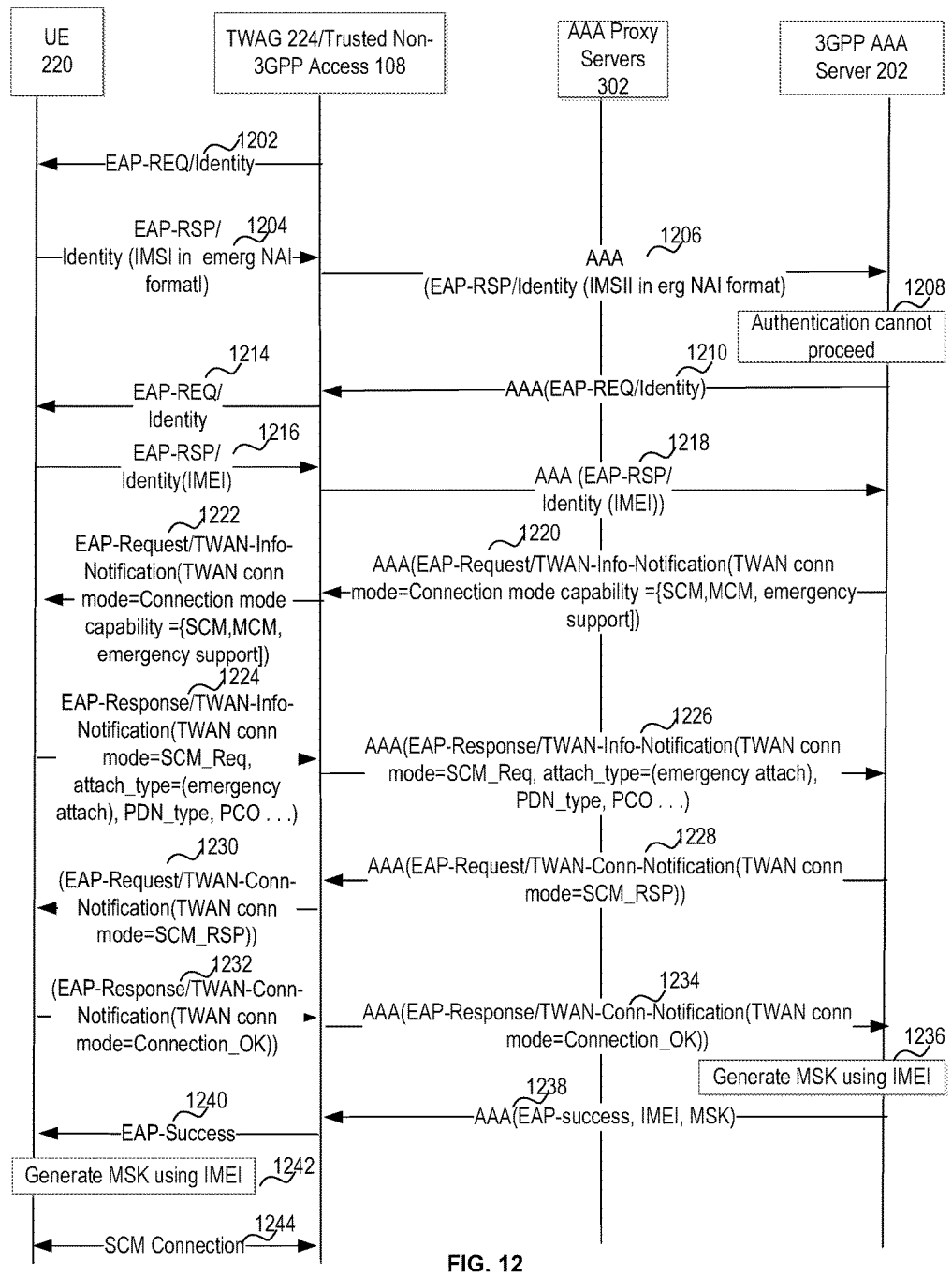
FIG. 12 illustrates a logical flow diagram of an embodiment of a method for support of emergency session establishment by an unauthenticated UE.

FIG. 12 illustrates a logical flow diagram of an embodiment of a method for support of emergency session establishment by an unauthenticated UE 220. An unauthenticated UE 220 may request emergency session establishment using an SCM type connection mode via a non-3GPP trusted access network 108, such as a trusted WLAN access network. In this embodiment, the UE 220 provides an IMSI in emergency NAI format to the AAA server as well as its IMEI. The emergency NAI indicates that an emergency connection is needed. For example, the emergency NAI may include "sos" in the domain name or other type of emergency indicator.

The TWAG 224 or other authenticator in the trusted non-3GPP access network 108 transmits an EAP message of identity request (EAP-REQ/Identity) to the UE 220 at 1202. In this embodiment, the UE 220 provides an IMSI to the AAA server 202 in an EAP message with of an identity response (EAP-RSP/Identity) at 1204. The access network 108 forwards the AAA(EAP-RSP/Identity) message with the IMSI of the UE to the AAA server 202 at 1206. An optional proxy server may reside between the AAA server and the unauthenticated UE 220 for relaying the messages.

The AAA server 202 determines that authentication cannot proceed at 1208 and requests further identification in an AAA(EAP-REQ/Identity) message to the UE 220 at 1210. The EAP-REQ/Identity message is transmitted to the UE 220 over the access network 108 at 1214. The UE 220 responds with an IMEI to the AAA server 202 in an EAP message with an identity response (EAP-RSP/Identity) at 1216. The access network 108 (such as an AP or TWAG 224) forwards an AAA(EAP-RSP/Identity) message with the IMEI to the AAA server 202 at 1218.

The AAA server 202 then transmits an EAP packet that includes a TWAN-Info-Notification Data field at 1220. The TWAN-Info-Notification Data field (TWAN conn mode) that may include a Network connection mode capability, such as SCM, MCM, emergency support. The TWAN-Info-Notification Data field may further include a UE connection Mode Message Type (UE_ConnectionModeMsgType) with Connection Capability data. The access network 108 then transmits the TWAN-Info-Notification Data message to the UE 220 at 1222.

The UE 220 requests a connection mode of SCM in an EAP-Response/TWAN-INFO-Notification message to the AAA server at 1224, which is forwarded by the access network 108 to the AAA server 202 at 1226. The TWAN-Info-Notification Data field may further include an attachment type request (emergency attachment) and PDN type and PCO supported.

The AAA server 202 responds with an EAP-Request/TWAN-CONN-Notification message at 1228 that specifies a TWAN connection mode of SCM (TWAN conn mode=SCM_RSP) that is forwarded to the UE 220 by the access network 108 at 1230. The UE 220 transmits an EAP-Response/TWAN-CONN-Notification message confirming the connection mode of SCM (TWAN conn mode=Connection_OK) at 1232. The TWAG 224 forwards the message to the AAA server 202 at 1234. The UE 220 and AAA server 202 then complete the SCM connection. For example, the AAA server 202 generates an MSK using the IMEI of the UE 220 at 1236. The AAA server 202 transmits an EAP-success message with the IMEI and MSK at 1238, which is forwarded to the UE 220 by the access network 108 at 1240. The UE generates the MSK using the IMEI at 1242 and establishes the SCM connection at 1244.

The AAA server thus indicates that it supports emergency session establishment in an EAP-Request/TWAM-INFO-Notification to the unauthenticated UE 220. The UE 220 requests a connection mode of SCM in an EAP-Response/TWAN-INFO-Notification message to the AAA server with an attachment type of emergency session. The AAA server responds with an EAP-Request/TWAN-CONN-Notification message that specifies a TWAN connection mode of SCM. The UE 220 sends an EAP-Response/TWAN-CONN-Notification message confirming the connection mode of SCM. The UE 220 then establishes the SCM connection.

Figure 13:
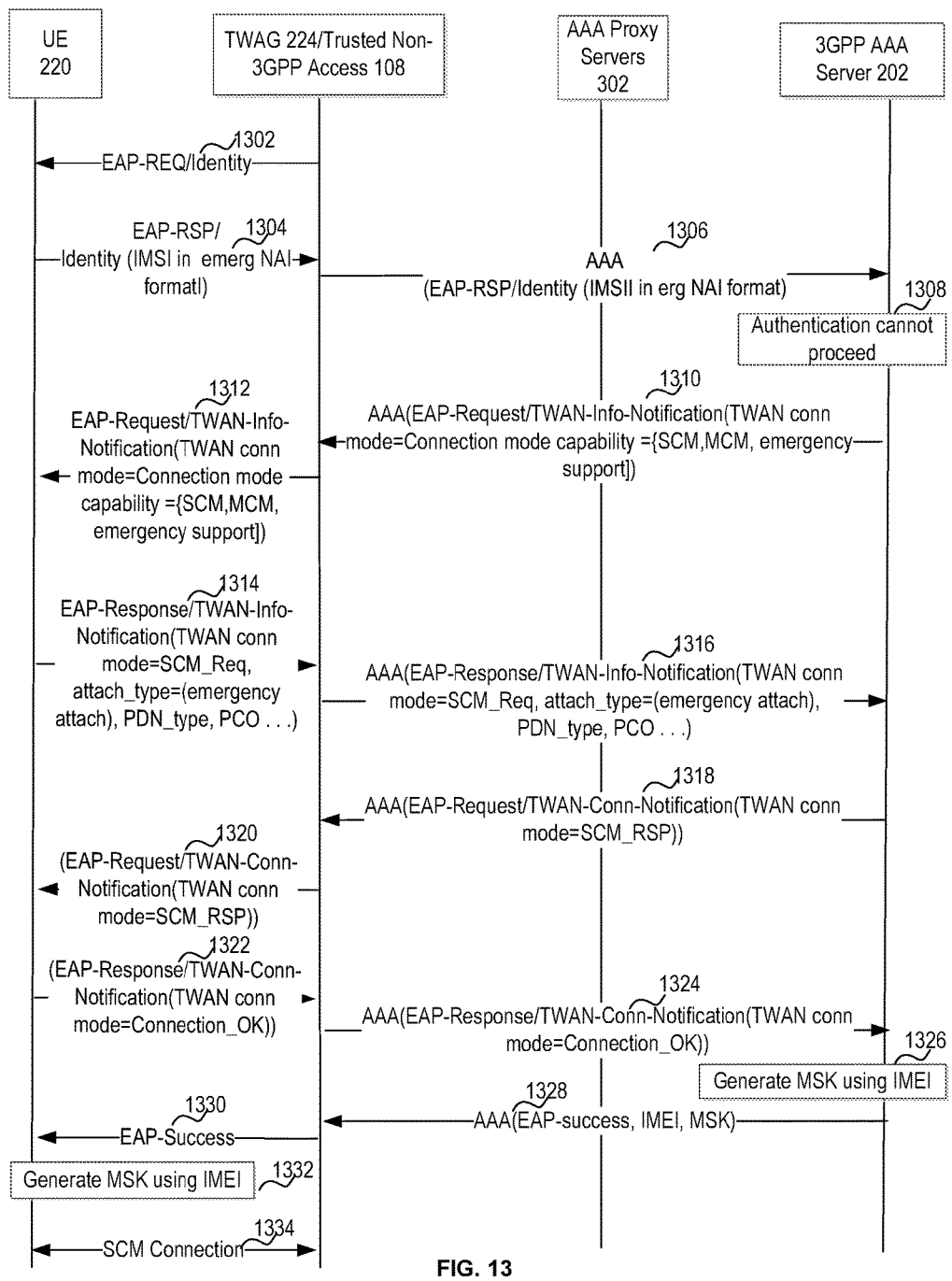
FIG. 13 illustrates a logical flow diagram of an embodiment of a method for support of emergency session establishment by an unauthenticated UE.

FIG. 13 illustrates a logical flow diagram of an embodiment of a method for support of emergency session establishment by an unauthenticated UE. In this embodiment, the unauthenticated UE 220 does not have UICC capabilities, e.g. the UE 220 does not have a UICC, has an inoperable UICC, etc. In this embodiment, the UE 220 does not communicate an IMSI to the AAA server. The UE 220 provides an IMEI in emergency NAI format. The AAA server indicates that it supports emergency session establishment in an EAP-Request/TWAM-INFO-Notification to the unauthenticated UE.

An EAP-REQ/Identity message is transmitted to the UE 220 over the access network 108 at 1302. The UE 220 responds with an IMEI to the AAA server 202 in an EAP message with an identity response (EAP-RSP/Identity) at 1304. The access network 108 (such as an AP or TWAG 224) forwards an AAA(EAP-RSP/Identity) message with the IMEI to the AAA server 202 at 1306.

The AAA server 202 then determines that authentication cannot proceed at 1308 and transmits an EAP packet that includes a TWAN-Info-Notification Data field at 1310. The TWAN-Info-Notification Data field (TWAN conn mode) may include a Network connection mode capability, such as SCM, MCM, emergency support. The TWAN-Info-Notification Data field may further include a UE connection Mode Message Type (UE_ConnectionModeMsgType) with Connection Capability data. The access network 108 then transmits the TWAN-Info-Notification Data message to the UE 220 at 1312.

The UE 220 requests a connection mode of SCM in an EAP-Response/TWAN-INFO-Notification message to the AAA server at 1314, which is forwarded by the access network 108 to the AAA server 202 at 1316. The TWAN-Info-Notification Data field may further include an attachment type request (emergency attachment) and PDN type and PCO supported.

The AAA server 202 responds with an EAP-Request/TWAN-CONN-Notification message at 1318 that specifies a TWAN connection mode of SCM (TWAN conn mode=SCM_RSP) that is forwarded to the UE 220 by the access network 108 at 1320. The UE 220 transmits an EAP-Response/TWAN-CONN-Notification message confirming the connection mode of SCM (TWAN conn mode=Connection_OK) at 1322. The access network 108 forwards the message to the AAA server 202 at 1324. The UE 220 and AAA server 202 then complete the SCM connection. For example, the AAA server 202 generates an MSK using the IMEI of the UE 220 at 1326. The AAA server 202 transmits an EAP-success message with the IMEI and MSK at 1328, which is forwarded to the UE 220 by the access network 108 at 1330. The UE generates the MSK using the IMEI at 1332 and establishes the SCM connection at 1334.

The AAA server 202 thus indicates that it supports emergency session establishment in an EAP-Request/TWAM-INFO-Notification to the unauthenticated UE 220. The UE 220 requests a connection mode of SCM in an EAP-Response/TWAN-INFO-Notification message to the AAA server 202 with an attachment type of emergency session. The AAA server 202 responds with an EAP-Request/TWAN-CONN-Notification message that specifies a TWAN connection mode of SCM. The UE 220 sends an EAP-Response/TWAN-CONN-Notification message confirming the connection mode of SCM. The UE 220 then establishes the SCM connection.

Figure 14:
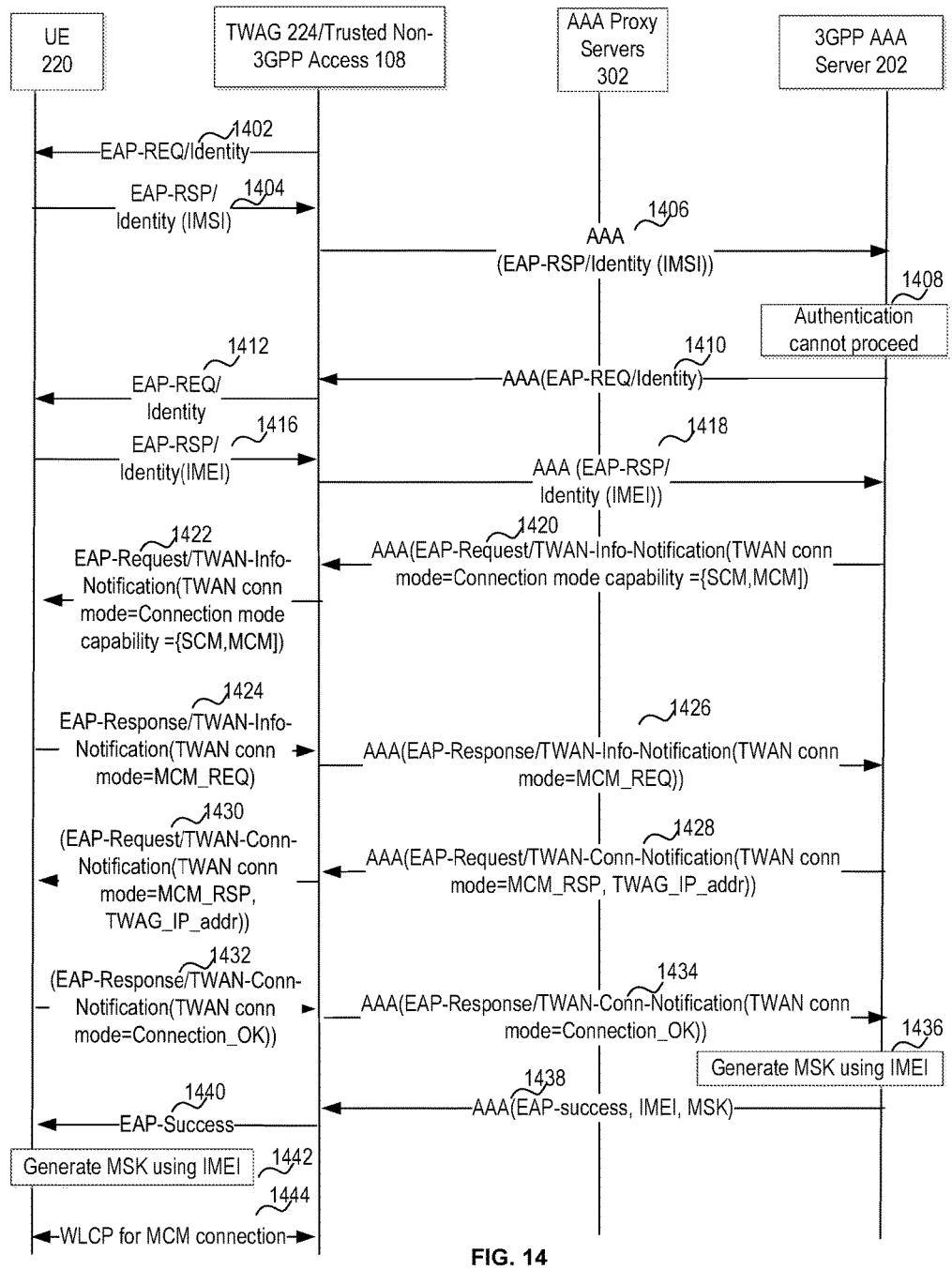
FIG. 14 illustrates a logical flow diagram of an embodiment of a method for support of general service access by an unauthenticated UE using an MCM type connection.

FIG. 14 illustrates a logical flow diagram of an embodiment of a method for support of general service access by an unauthenticated UE 220 using an MCM type connection. An unauthenticated UE 220 may request session establishment for network services other than emergency services. FIG. 14 illustrates an example wherein the unauthenticated UE 220 requests a MCM type connection mode via a non-3GPP trusted access network 108, such as a trusted WLAN access network. In this embodiment, the UE 220 provides an IMSI to the AAA server as well as an IMEI.

The access network 108 (such as a TWAG 224, AP or other authenticator in the trusted non-3GPP access network 108) transmits an EAP message of identity request (EAP-REQ/Identity) to the UE 220 at 1402. In this embodiment, the UE 220 provides an IMSI to the AAA server 202 in an EAP message with an identity response (EAP-RSP/Identity) at 1404. The access network 108 forwards the AAA(EAP-RSP/Identity) message with the IMSI of the UE to the AAA server 202 at 1406. An optional proxy server may reside between the AAA server and the unauthenticated UE 220 for relaying the messages.

The AAA server 202 determines that authentication cannot proceed at 1408 and requests further identification at 1410 in an AAA(EAP-REQ/Identity) message to the access network 108. The EAP-REQ/Identity message is transmitted to the UE 220 over the access network 108 at 1412. The UE 220 responds with an IMEI to the AAA server 202 in an EAP message with an identity response (EAP-RSP/Identity) at 1416. The access network 108 forwards an AAA(EAP-RSP/Identity) message with the IMEI to the AAA server 202 at 1418.

The AAA server 202 then transmits an EAP packet that includes a TWAN-Info-Notification Data field at 1420. The TWAN-Info-Notification Data field (TWAN conn mode) may include a Network connection mode capability, such as SCM, MCM. The TWAN-Info-Notification Data field may further include a UE connection Mode Message Type (UE_ConnectionModeMsgType) with Connection Capability data. The access network 108 then transmits the TWAN-Info-Notification Data message to the UE 220 at 1422.

The UE 220 requests a connection mode of MCM (TWAN conn mode=MCM_REQ) in an EAP-Response/TWAN-INFO-Notification message to the AAA server at 1424, which is forwarded by the access network 108 to the AAA server 202 at 1426. The TWAN-Info-Notification Data field may further include an attachment type request (initial attach) and PDN type and PCO supported.

The AAA server 202 responds with an EAP-Request/TWAN-CONN-Notification message at 1428 that specifies a TWAN connection mode of MCM (TWAN conn mode=MCM_RSP) an an IP address of a TWAG 224 (TWAG_IP_addr) that is forwarded to the UE 220 by the access network 108 at 1430. The UE 220 transmits an EAP-Response/TWAN-CONN-Notification message confirming the connection mode of MCM (TWAN conn mode=Connection_OK) at 1432. The access network 108 forwards the message to the AAA server 202 at 1434. The UE 220 and AAA server 202 then complete the MCM connection. For example, the AAA server 202 generates an MSK using the IMEI of the UE 220 at 1040. The AAA server 202 transmits an EAP-success message with the IMEI and MSK at 1042, which is forwarded to the UE 220 by the TWAG 224 at 1044. The UE generates the MSK using the IMEI at 1046 and establishes the MCM connection using WLCP at 1048.

In this embodiment, the unauthenticated UE 220 requests a connection mode of MCM in an EAP-Response/TWAN- INFO-Notification message to the AAA server 202. The AAA server responds with an EAP-Request/TWAN-CONN-Notification message that specifies a TWAN connection mode of MCM and includes a TWAG_IP_address, e.g. an IP address of a trusted wireless access gateway (TWAG). The UE 220 sends an EAP-Response/TWAN-CONN-Notification message confirming the connection mode of MCM. The unauthenticated UE 220 initiates connection establishment using the WLCP protocol towards the identified TWAG 224 in the access network using the TWAG_IP_address received from AAA server 202. The UE 220 and the TWAG then establish the MCM connection.

Figure 15:
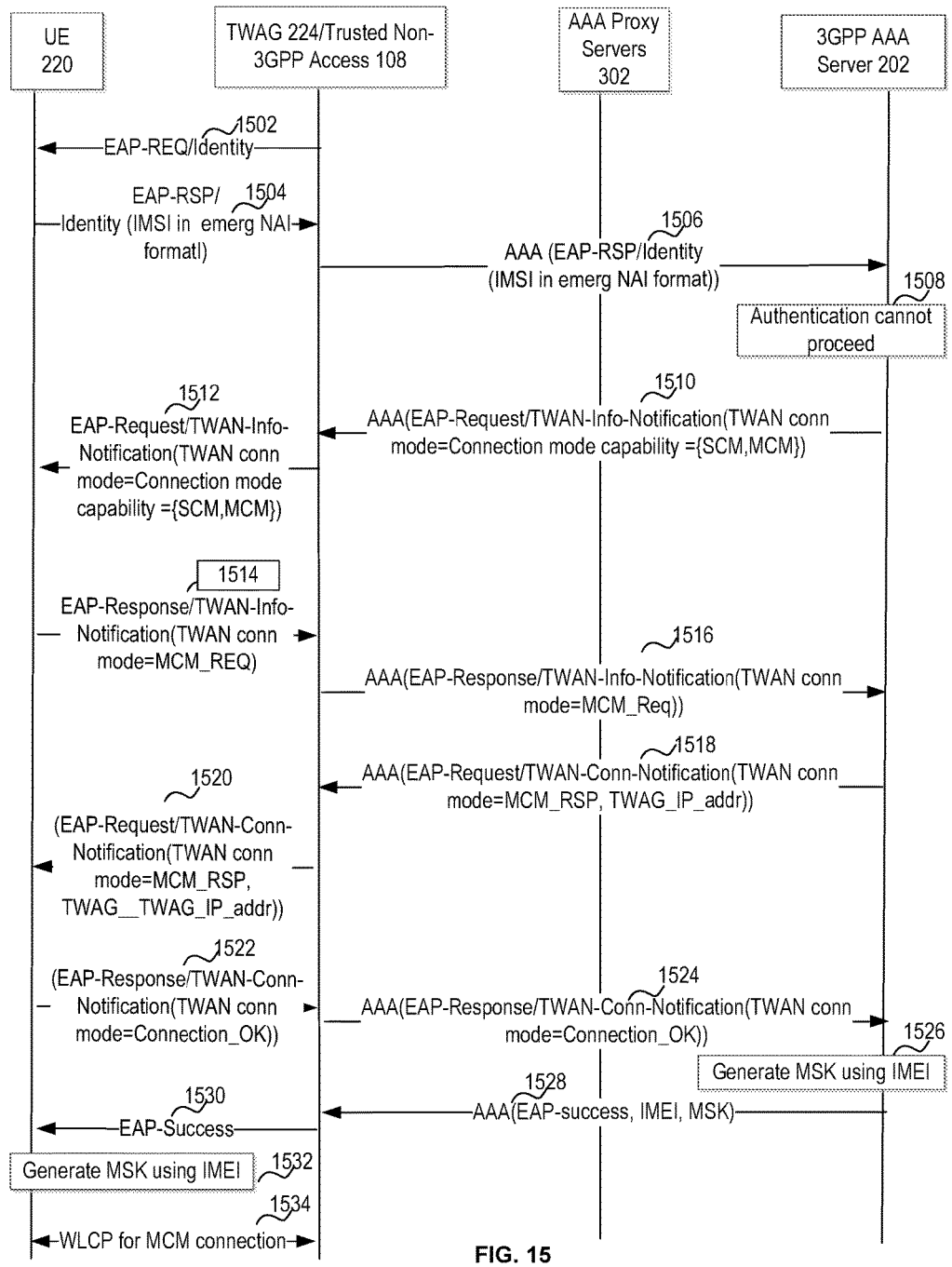
FIG. 15 illustrates a logical flow diagram of another embodiment of a method for support of general service access by an unauthenticated UE using an MCM type connection.

FIG. 15 illustrates a logical flow diagram of another embodiment of a method for support of general service access by an unauthenticated UE 220 using an MCM type connection. In this embodiment, the unauthenticated UE 220 does not have UICC capabilities, e.g. the UE 220 does not have a UICC, has an inoperable UICC, etc. The UE 220 does not communicate an IMSI to the AAA server but only an IMEI of the UE 220.

An EAP-REQ/Identity message is transmitted to the UE 220 over the access network 108 at 1502. The UE 220 responds with an IMEI to the AAA server 202 in an EAP message with an identity response (EAP-RSP/Identity) at 1504. The access network 108 forwards an AAA(EAP-RSP/Identity) message with the IMEI to the AAA server 202 at 1506.

The AAA server 202 determines that authentication cannot proceed at 1508 and then transmits an EAP packet that includes a TWAN-Info-Notification Data field at 1510. The TWAN-Info-Notification Data field (TWAN conn mode) may include a Network connection mode capability, such as SCM, MCM. The TWAN-Info-Notification Data field may further include a UE connection Mode Message Type (UE_ConnectionModeMsgType) with Connection Capability data. The access network 108 then transmits the TWAN-Info-Notification Data message to the UE 220 at 1512.

The UE 220 requests a connection mode of MCM (TWAN conn mode=MCM_REQ) in an EAP-Response/TWAN-INFO-Notification message to the AAA server at 1514, which is forwarded by the TWAG 224 to the AAA server 202 at 1516. The TWAN-Info-Notification Data field may further include an attachment type request (initial attach) and PDN type and PCO supported.

The AAA server 202 responds with an EAP-Request/TWAN-CONN-Notification message at 1518 that specifies a TWAN connection mode of MCM (TWAN conn mode=MCM_RSP) an IP address of a TWAG 224 (TWAG_IP_addr) that is forwarded to the UE 220 by the access network 108 at 1520. The UE 220 transmits an EAP-Response/TWAN-CONN-Notification message confirming the connection mode of MCM (TWAN conn mode=Connection_OK) at 1522. The access network 108 forwards the message to the AAA server 202 at 1524. The UE 220 and AAA server 202 then complete the MCM connection. For example, the AAA server 202 generates an MSK using the IMEI of the UE 220 at 1526. The AAA server 202 transmits an EAP-success message with the IMEI and MSK at 1528, which is forwarded to the UE 220 by the TWAG 224 at 1530. The UE 220 generates the MSK using the IMEI at 1532 and establishes the MCM connection using WLCP at 1534.

The unauthenticated UE 220 thus requests a connection mode of MCM in an EAP-Response/TWAN-INFO-Notification message to the AAA server. The AAA server responds with an EAP-Request/TWAN-CONN-Notification message that specifies a TWAN connection mode of MCM and includes a TWAG_IP_address, e.g. an IP address of a trusted wireless access gateway (TWAG). The UE 220 sends an EAP-Response/TWAN-CONN-Notification message confirming the connection mode of MCM. The unauthenticated UE 220 initiates connection establishment using the WLCP protocol towards the identified TWAG in the access network using the TWAG_IP_address received from AAA server 202. The UE 220 and the TWAG 224 then establish the MCM connection.

Figure 16:
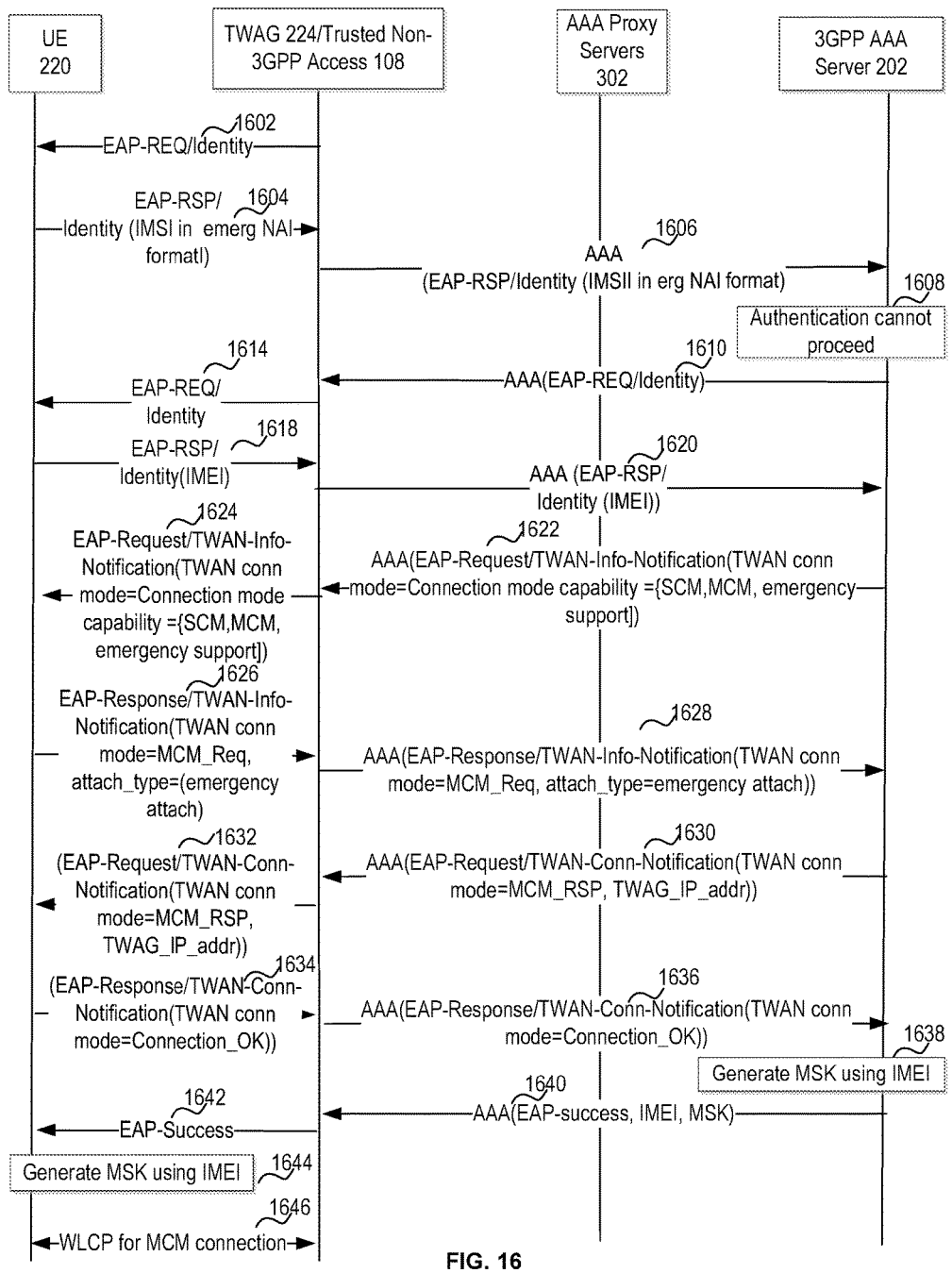
FIG. 16 illustrates a logical flow diagram of an embodiment of a method for support of emergency session establishment by an unauthenticated UE using an MCM type connection.

FIG. 16 illustrates a logical flow diagram of an embodiment of a method for support of emergency session establishment by an unauthenticated UE 220 using an MCM type connection. An unauthenticated UE 220 may request emergency session establishment using an MCM type connection mode via a non-3GPP trusted access network, such as a trusted WLAN access network. In this embodiment, the UE 220 provides an IMSI in emergency NAI format to the AAA server as well as its IMEI.

The access network 108 (such as a TWAG 224, AP or other authenticator in the trusted non-3GPP access network 108) transmits an EAP message of identity request (EAP-REQ/Identity) to the UE 220 at 1602. In this embodiment, the UE 220 provides an IMSI in an emergency NAI format to the AAA server 202 in an EAP message with an identity response (EAP-RSP/Identity) at 1604. The access network 108 forwards the AAA(EAP-RSP/Identity) message with the IMSI in the emergency NAI format of the UE to the AAA server 202 at 1606. An optional proxy server may reside between the AAA server and the unauthenticated UE 220 for relaying the messages.

The AAA server 202 determines that authentication cannot proceed at 1608 and requests further identification in an AAA(EAP-REQ/Identity) message to the UE 220 at 1610. The EAP-REQ/Identity message is transmitted to the UE 220 over the access network 108 at 1614. The UE 220 responds with an IMEI to the AAA server 202 in an EAP message with an identity response (EAP-RSP/Identity) at 1618. The access network 108 (such as an AP or TWAG 224) forwards an AAA(EAP-RSP/Identity) message with the IMEI to the AAA server 202 at 1620.

The AAA server 202 then transmits an EAP packet that includes a TWAN-Info-Notification Data field at 1622. The TWAN-Info-Notification Data field (TWAN conn mode) that may include a Network connection mode capability, such as SCM, MCM, emergency support. The TWAN-Info-Notification Data field may further include a UE connection Mode Message Type (UE_ConnectionModeMsgType) with Connection Capability data. The access network 108 then transmits the TWAN-Info-Notification Data message to the UE 220 at 1624.

The UE 220 requests a connection mode of MCM in an EAP-Response/TWAN-INFO-Notification message to the AAA server at 1626, which is forwarded by the access network 108 to the AAA server 202 at 1628. The TWAN-Info-Notification Data field may further include an attachment type request (emergency attachment) and PDN type and PCO supported.

The AAA server 202 responds with an EAP-Request/TWAN-CONN-Notification message at 1630 that specifies a TWAN connection mode of MCM (TWAN conn mode=MCM_RSP) and an IP address of a TWAG 224 (TWAG_IP_addr) that is forwarded to the UE 220 by the access network 108 at 1632. The UE 220 transmits an EAP-Response/TWAN-CONN-Notification message confirming the connection mode of MCM (TWAN conn mode=Connection_OK) at 1634. The access network 108 forwards the message to the AAA server 202 at 1636. The UE 220 and AAA server 202 then complete the MCM connection. For example, the AAA server 202 generates an MSK using the IMEI of the UE 220 at 1638. The AAA server 202 transmits an EAP-success message with the IMEI and MSK at 1640, which is forwarded to the UE 220 by the TWAG 224 at 1642. The UE 220 generates the MSK using the IMEI at 1644 and establishes the MCM connection using WLCP at 1646.

In this embodiment, the AAA server 202 indicates that it supports emergency session establishment in an EAP-Request/TWAM-INFO-Notification to the unauthenticated UE 220. The UE 220 requests a connection mode of MCM in an EAP-Response/TWAN-INFO-Notification message to the AAA server with an attachment type of emergency session. The AAA server responds with an EAP-Request/TWAN-CONN-Notification message that specifies a TWAN connection mode of MCM and includes a TWAG_IP_address, e.g. an IP address of a trusted wireless access gateway (TWAG) 224. The UE 220 sends an EAP-Response/TWAN-CONN-Notification message confirming the connection mode of MCM. The unauthenticated UE 220 initiates connection establishment using the WLCP protocol towards the identified TWAG 224 in the access network using the TWAG_IP_address received from AAA server. The UE 220 and the TWAG then establish the MCM connection.

Figure 17:
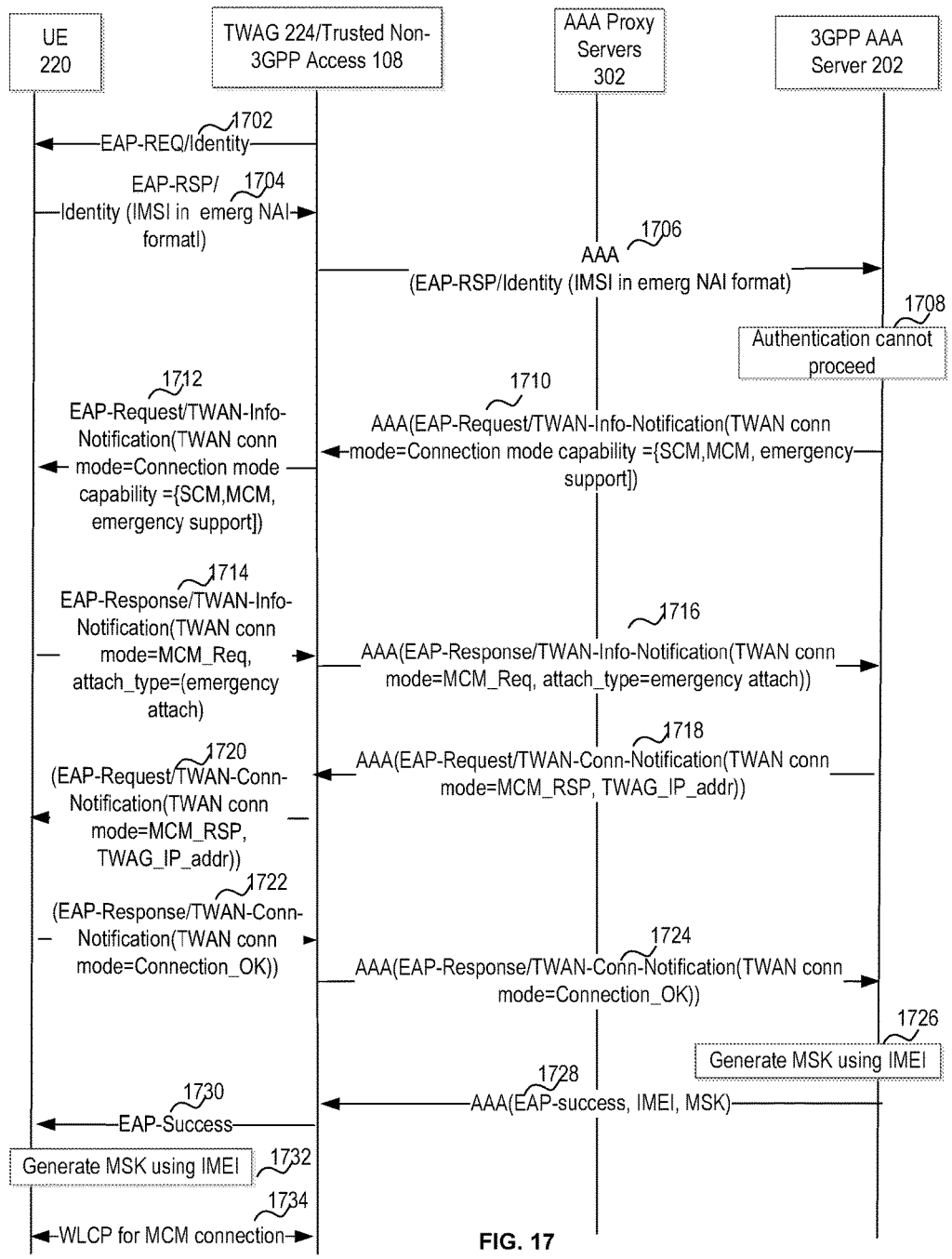
FIG. 17 illustrates a logical flow diagram of an embodiment of a method for support of emergency session establishment by an unauthenticated UE using an MCM type connection.

FIG. 17 illustrates a logical flow diagram of an embodiment of a method for support of emergency session establishment by an unauthenticated UE 220 using an MCM type connection. An unauthenticated UE 220 may request emergency session establishment using an MCM type connection mode via a non-3GPP trusted access network, such as a trusted WLAN access network. In this embodiment, the unauthenticated UE 220 does not have UICC capabilities, e.g. the UE 220 does not have a UICC, has an inoperable UICC, etc. The UE 220 does not communicate an IMSI to the AAA server.

An EAP-REQ/Identity message is transmitted to the UE 220 over the access network 108 at 1702. The UE 220 responds with an IMSI in emergency format to the AAA server 202 in an EAP message with an identity response (EAP-RSP/Identity) at 1704. The access network 108 (such as an AP or TWAG 224) forwards an AAA(EAP-RSP/Identity) message with the IMSI in emergency NAI format to the AAA server 202 at 1706. The emergency NAI is the NAI format used by the UE 220 when it attempts to authenticate for making an IMS emergency call. An example of the emergency NAI format is specified in 3GPP TS 23.003, entitled, "Numbering, addressing and identification", subclause 14.8, Version 14.0 dated Jun. 22, 2016. An example of a WLAN emergency NAI realm is: IMSI in use: 234150999999999; Where: MCC=234; MNC=15; MSIN=0999999999, which gives the home network domain name: sos.wlan.mnc015.mcc234.3gppnetwork.org.

The AAA server 202 determines that authentication may not proceed at 1708 and then transmits an EAP packet that includes a TWAN-Info-Notification Data field at 1710. The TWAN-Info-Notification Data field (TWAN conn mode) may include a Network connection mode capability, such as SCM, MCM, emergency support. The TWAN-Info-Notification Data field may further include a UE connection Mode Message Type (UE_ConnectionModeMsgType) with Connection Capability data. The access network 108 then transmits the TWAN-Info-Notification Data message to the UE 220 at 1712.

The UE 220 requests a connection mode of MCM in an EAP-Response/TWAN-INFO-Notification message to the AAA server at 1714, which is forwarded by the access network 108 to the AAA server 202 at 1716. The TWAN-Info-Notification Data field may further include an attachment type request (emergency attachment) and PDN type and PCO supported.

The AAA server 202 responds with an EAP-Request/TWAN-CONN-Notification message at 1718 that specifies a TWAN connection mode of MCM (TWAN conn mode=MCM_RSP) and an IP address of a TWAG 224 (TWAG_IP_addr) that is forwarded to the UE 220 by the access network 108 at 1720. The UE 220 transmits an EAP-Response/TWAN-CONN-Notification message confirming the connection mode of MCM (TWAN conn mode=Connection_OK) at 1722. The access network 108 forwards the message to the AAA server 202 at 1724. The UE 220 and AAA server 202 then complete the MCM connection. For example, the AAA server 202 generates an MSK using the IMEI of the UE 220 at 1726. The AAA server 202 transmits an EAP-success message with the IMEI and MSK at 1728, which is forwarded to the UE 220 by the TWAG 224 at 1739. The UE 220 generates the MSK using the IMEI at 1732 and establishes the MCM connection using WLCP at 1734.

In this embodiment, the UE 220 provides an IMEI in an emergency NAI format. For example, the emergency NAI format using an IMEI is:
  imei<IMEI>@sos.wlan.mnc<visitedMNC>.mcc<visited
    MCC>.3gppnetwork.org The AAA server indicates that it supports emergency session establishment in an EAP-Request/TWAM-INFO-Notification to the unauthenticated UE. The UE 220 requests a connection mode of MCM in an EAP-Response/TWAN-INFO-Notification message to the AAA server with an attachment type of emergency session. The AAA server responds with an EAP-Request/TWAN-CONN-Notification message that specifies a TWAN connection mode of MCM and includes a TWAG_IP_address, e.g. an IP address of a trusted wireless access gateway (TWAG) 224. The UE 220 sends an EAP-Response/TWAN-CONN-Notification message confirming the connection mode of MCM. The unauthenticated UE 220 initiates connection establishment using the WLCP protocol towards the identified TWAG in the access network using the TWAG_IP_address received from AAA server 202. The UE 220 and the TWAG 224 then establish the MCM connection.

Alternative EAP/Notification Embodiment

In another embodiment, the AAA server 202 initiates an emergency session by default for unauthenticated UEs 220 using MCM mode or SCM mode. When the 3GPP AAA server 202 is configured to accept unauthenticated emergency session over WLAN and IMEI was received or IMSI was received but IMSI authentication cannot proceed, the 3GPP AAA server 202 by default initiates a connection mode (MCM or SCM) with emergency session.

Figure 18:
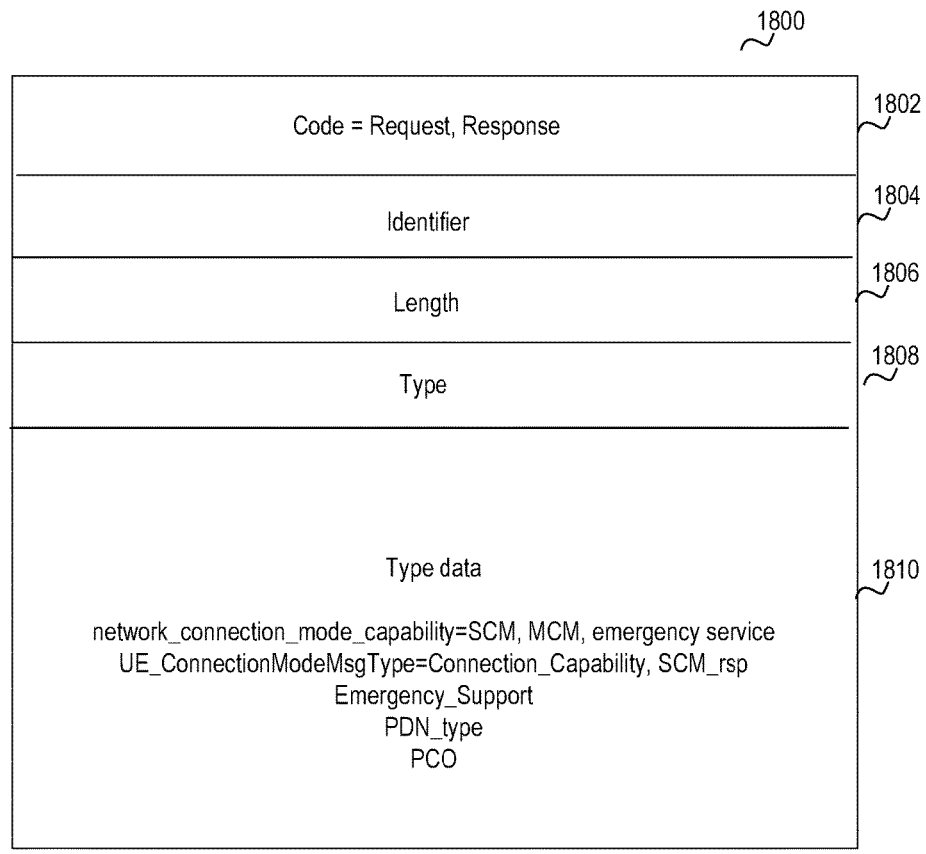
FIG. 18 illustrates a schematic block diagram of an EAP Packet format using an EAP-Request/Notification method for SCM mode negotiation.

FIG. 18 illustrates a schematic block diagram of an EAP Packet format 1800 using an EAP-Request/Notification method for SCM mode negotiation. The EAP packet 1800 includes a code 1802 indicating a request or response message, an identifier field 1804, a length field 1806 and a type field 1808. The EAP packet 1800 further includes a type data field 1810. The type data field 1810 in the EAP-Request/Notification includes a network connection mode capability field that may specify one of: SCM, MCM or emergency service. The type data field 1810 also includes a UE 220 connection mode message type (UE_ConnectionModeMsgType) that may specify a connection capability or SCM connection mode. The type field may also indicate emergency support, PDN type, PCO, etc.

Figure 19:
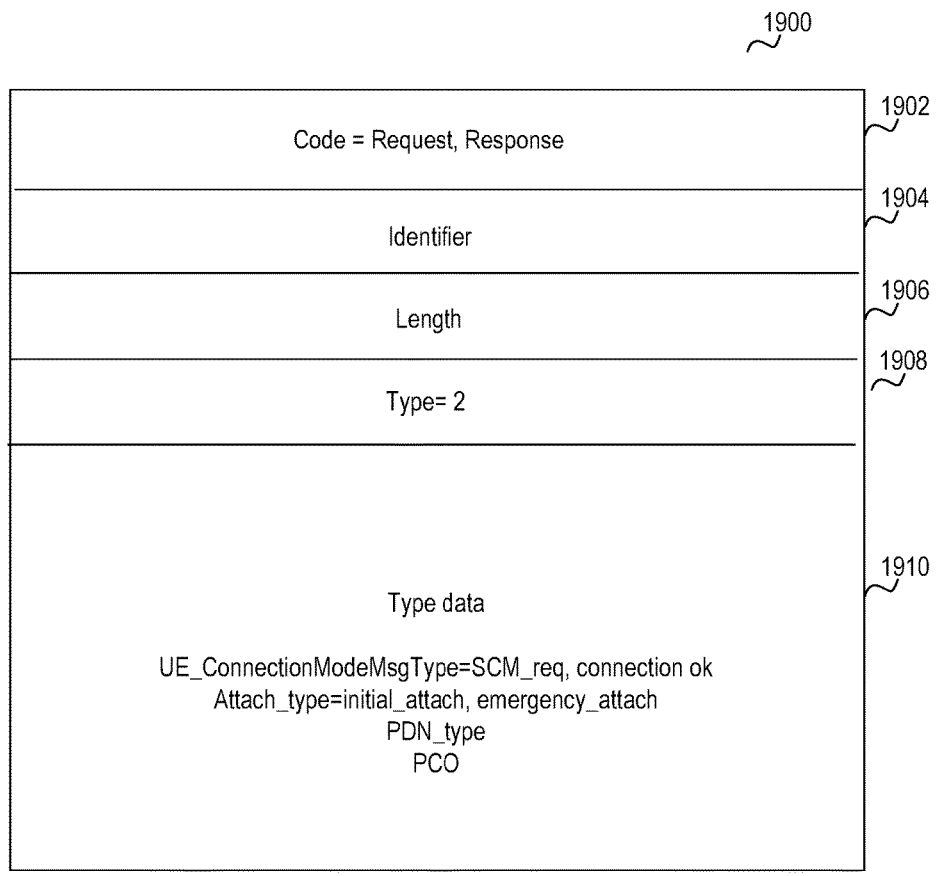
FIG. 19 illustrates a schematic block diagram of an EAP Packet format using an EAP-Response/Notification method for SCM mode negotiation.

FIG. 19 illustrates a schematic block diagram of an EAP Packet format 1900 using an EAP-Response/Notification method for SCM mode negotiation. The EAP packet 1900 includes a code 1902 indicating a request or response message, an identifier field 1904, a length field 1906 and a type field 1908. The EAP packet 1900 further includes a type data field 1910. The type data field 1910 in the EAP-Response/Notification includes a UE 220 connection mode message type (UE_ConnectionModeMsgType) that may request an SCM connection mode or indicate that the connection is accepted. The type data field further includes an attachment type as either an initial attachment or emergency attachment. The type field may also indicate PDN type, PCO, etc.

Figure 20:
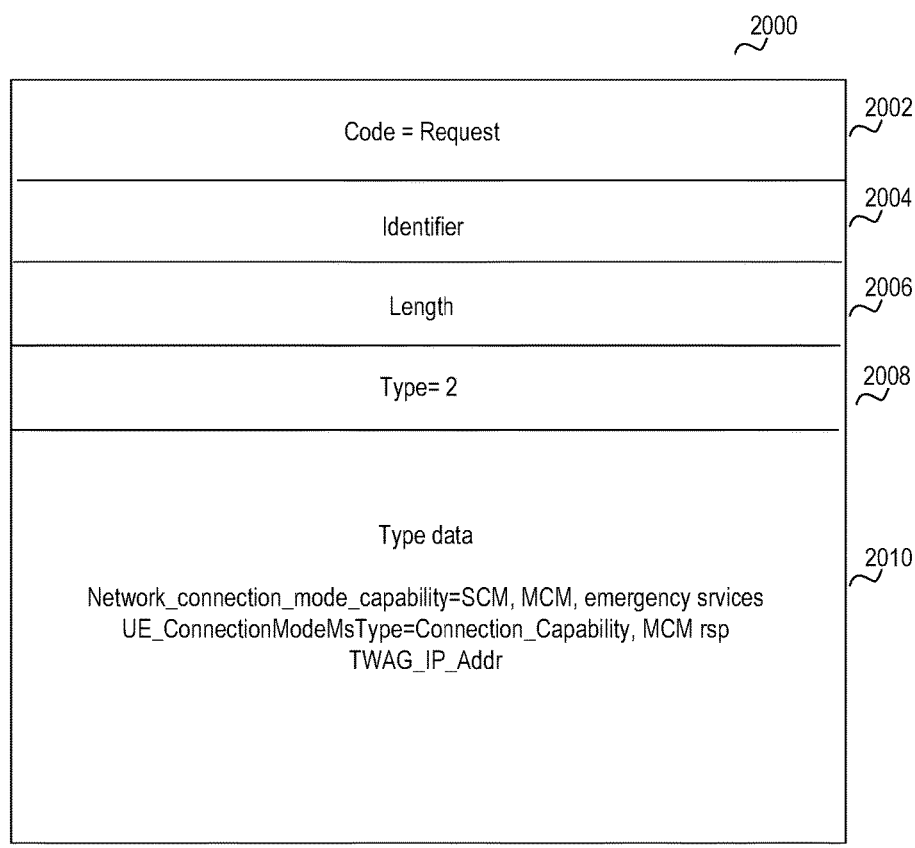
FIG. 20 illustrates a schematic block diagram of an EAP Packet format using an EAP-Request/Notification method for MCM mode negotiation.

FIG. 20 illustrates a schematic block diagram of an EAP Packet format 2000 using an EAP-Request/Notification method for MCM mode negotiation. The EAP packet 2000 includes a code 2002 indicating a request message, an identifier field 2004, a length field 2006 and a type field 2008. The EAP packet 2000 further includes a type data field 2010. The type data field 2010 in the EAP-Request/Notification includes a network connection mode capability indicator that may specify one or more of: SCM, MCM or emergency services. The type data field also includes a UE connection mode message type (UE_ConnectionModeMsgType) that may specify a connection capability or MCM connection mode. The type field also indicates the TWAG_IP_Addr, e.g. the address of the TWAG for the non-3GPP trusted access network 108 for attachment by the UE 220. The type field 2010 may also indicate other values.

Figure 21:
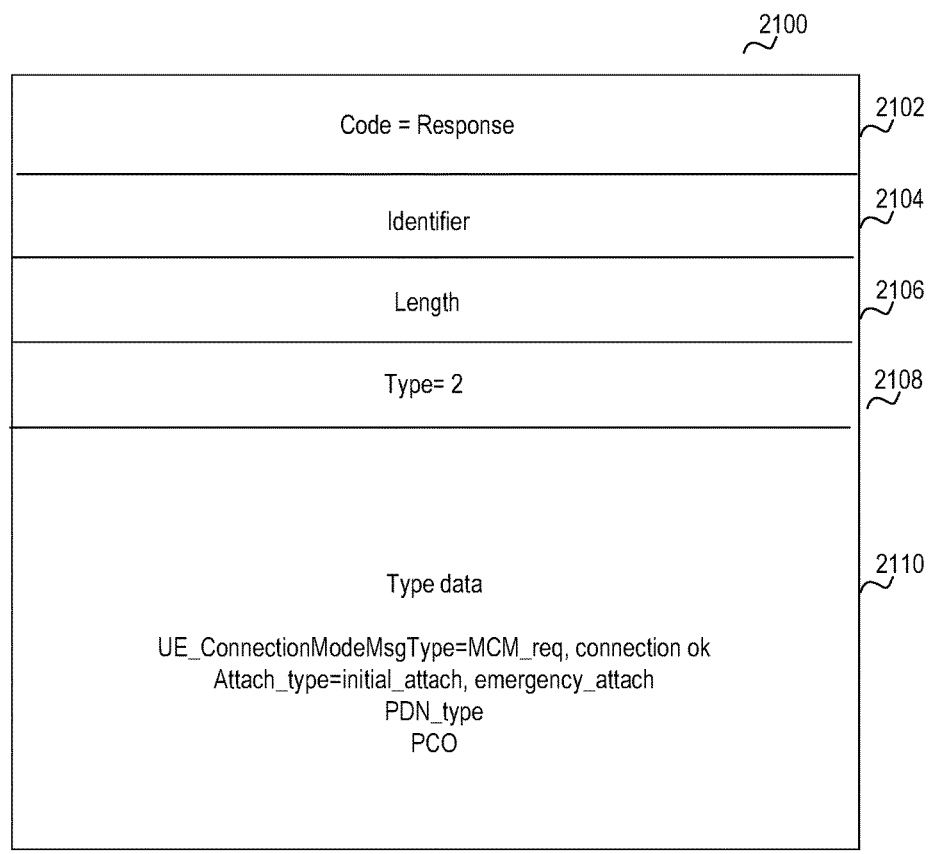
FIG. 21 illustrates a schematic block diagram of an EAP Packet format using an EAP-Response/Notification method for MCM mode negotiation

FIG. 21 illustrates a schematic block diagram of an EAP Packet format 2100 using an EAP-Response/Notification method for MCM mode negotiation. The EAP packet 2100 includes a code 2102 indicating a response message, an identifier field 2104, a length field 2106 and a type field 2008. The EAP packet 2100 further includes a type data field 2110. The type data field 2110 in the EAP-Response/Notification includes a UE connection mode message type (UE_ConnectionModeMsgType) that may request an MCM connection mode or specify that the connection is accepted. The type data field 2110 further includes an attachment type as either an initial attachment or emergency attachment. The type field may also indicate other values, such as PDN type and PCO.

Figure 22:
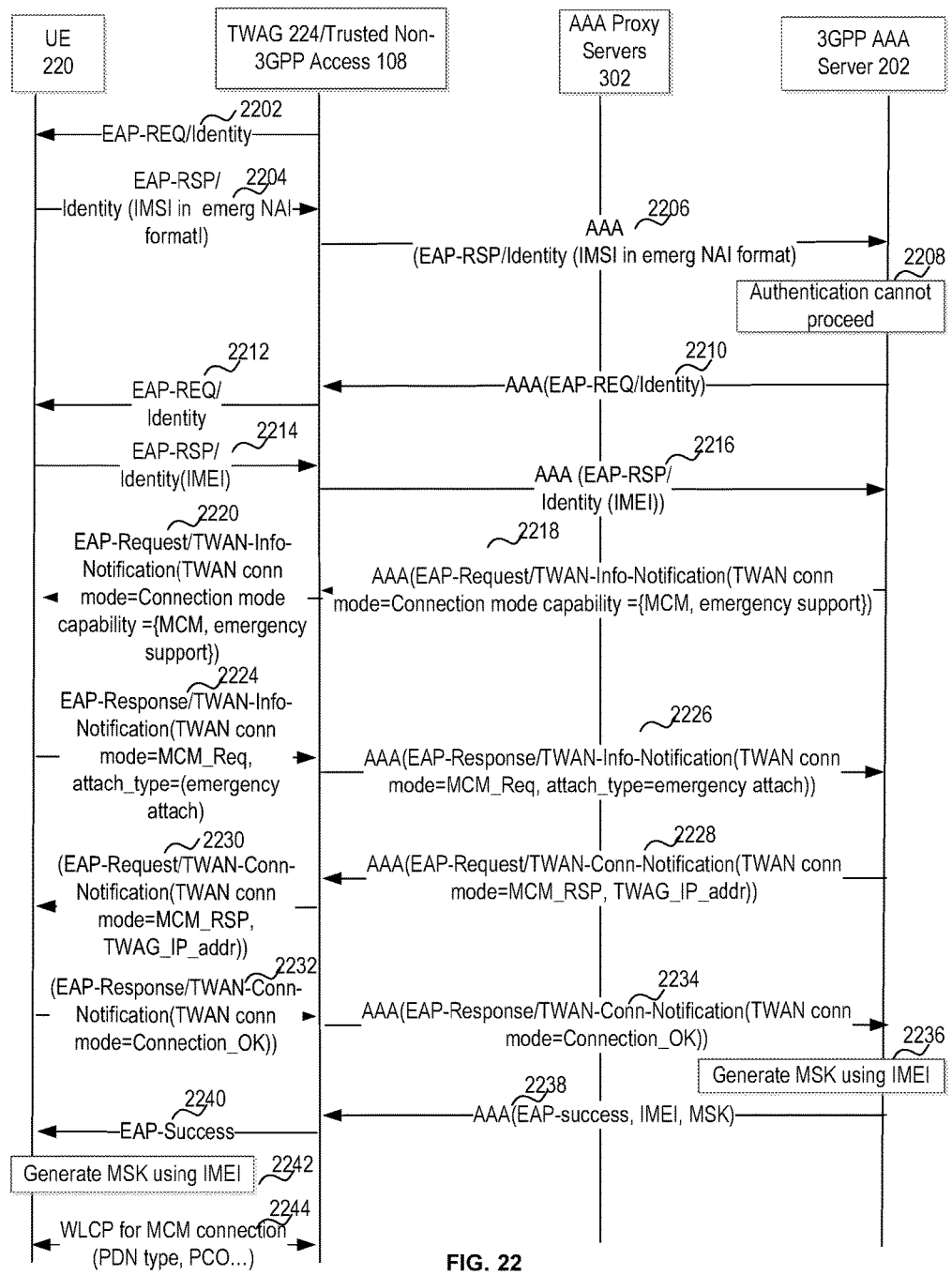
FIG. 22 illustrates a logical flow diagram of an embodiment of a method for emergency session establishment for an unauthenticated UE 220 to request an MCM connection type mode using an alternative EAP notification

FIG. 22 illustrates a logical flow diagram of an embodiment of a method for emergency session establishment for an unauthenticated UE 220 to request an MCM connection type mode using an alternative EAP notification. In this embodiment, an unauthenticated UE 220 may request emergency session establishment using an MCM type connection mode via a non-3GPP trusted access network, such as a trusted WLAN access network.

The access network 108 (such as a TWAG 224, AP or other authenticator in the trusted non-3GPP access network 108) transmits an EAP identity request message (EAP-REQ/Identity) to the UE 220 at 2202. In this embodiment, the UE 220 provides an IMSI in an emergency NAI format to the AAA server 202 in an EAP message with an identity response (EAP-RSP/Identity) at 2204. The access network 108 forwards the AAA(EAP-RSP/Identity) message with the IMSI in the emergency NAI format to the AAA server 202 at 2206. An optional proxy server may reside between the AAA server and the unauthenticated UE 220 for relaying the messages.

The AAA server 202 determines that authentication cannot proceed at 2208 and requests further identification in an AAA(EAP-REQ/Identity) message to the UE 220 at 2210. The EAP-REQ/Identity message is transmitted to the UE 220 over the access network 108 at 2212. The UE 220 responds with an IMEI to the AAA server 202 in an EAP message with an identity response (EAP-RSP/Identity) at 2214. The access network 108 (such as an AP or TWAG 224) forwards an AAA(EAP-RSP/Identity) message with the IMEI to the AAA server 202 at 2216.

The AAA server 202 then transmits an EAP packet that includes a TWAN-Info-Notification Data field at 2218. The TWAN-Info-Notification Data field (TWAN conn mode) includes a Network connection mode capability that indicates MCM and emergency support. The AAA server 202 thus initiates an emergency session by default for unauthenticated UEs 220 using MCM mode. The access network 108 then transmits the TWAN-Info-Notification Data message to the UE 220 at 2220.

The UE 220 requests a connection mode of MCM in an EAP-Response/TWAN-INFO-Notification message to the AAA server at 2224, which is forwarded by the access network 108 to the AAA server 202 at 2226. The TWAN-Info-Notification Data field may further include an attachment type request (emergency attachment) and PDN type and PCO supported.

The AAA server 202 responds with an EAP-Request/TWAN-CONN-Notification message at 2228 that specifies a TWAN connection mode of MCM (TWAN conn mode=MCM_RSP) and an IP address of a TWAG 224 (TWAG_IP_addr) that is forwarded to the UE 220 by the access network 108 at 2230. The UE 220 transmits an EAP-Response/TWAN-CONN-Notification message confirming the connection mode of MCM (TWAN conn mode=Connection_OK) at 2232. The access network 108 forwards the message to the AAA server 202 at 2234. The UE 220 and AAA server 202 then complete the MCM connection. For example, the AAA server 202 generates an MSK using the IMEI of the UE 220 at 2236. The AAA server 202 transmits an EAP-success message with the IMEI and MSK at 2238, which is forwarded to the UE 220 by the access network 108 at 2240. The UE 220 generates the MSK using the IMEI at 2242 and establishes the MCM connection using WLCP at 2244.

When the unauthenticated UE 220 provides an IMSI in emergency NAI format to the AAA server, the AAA server 202 initiates an emergency session by default for unauthenticated UEs 220 using MCM mode. The AAA server transmits an EAP-Request Notification message that indicates a TWAN connection mode or connection mode capability includes MCM and emergency session establishment. The UE 220 transmits to the AAA server an EAP-Response/Notification that includes a TWAN connection mode with a request for a connection mode of MCM and an attachment type of emergency session establishment. The AAA server responds with an EAP-Request/Notification message that specifies a TWAN connection mode of MCM and includes a TWAG_IP_address, e.g. an IP address of a trusted wireless access gateway (TWAG). The UE 220 sends an EAP-Response/Notification message confirming the connection mode of MCM is accepted. The unauthenticated UE 220 then initiates connection establishment using the WLCP protocol towards the identified TWAG 224 in the access network 108 using the TWAG IP address received from AAA server. The UE 220 and the TWAG 224 then establish the MCM connection.

Figure 23:
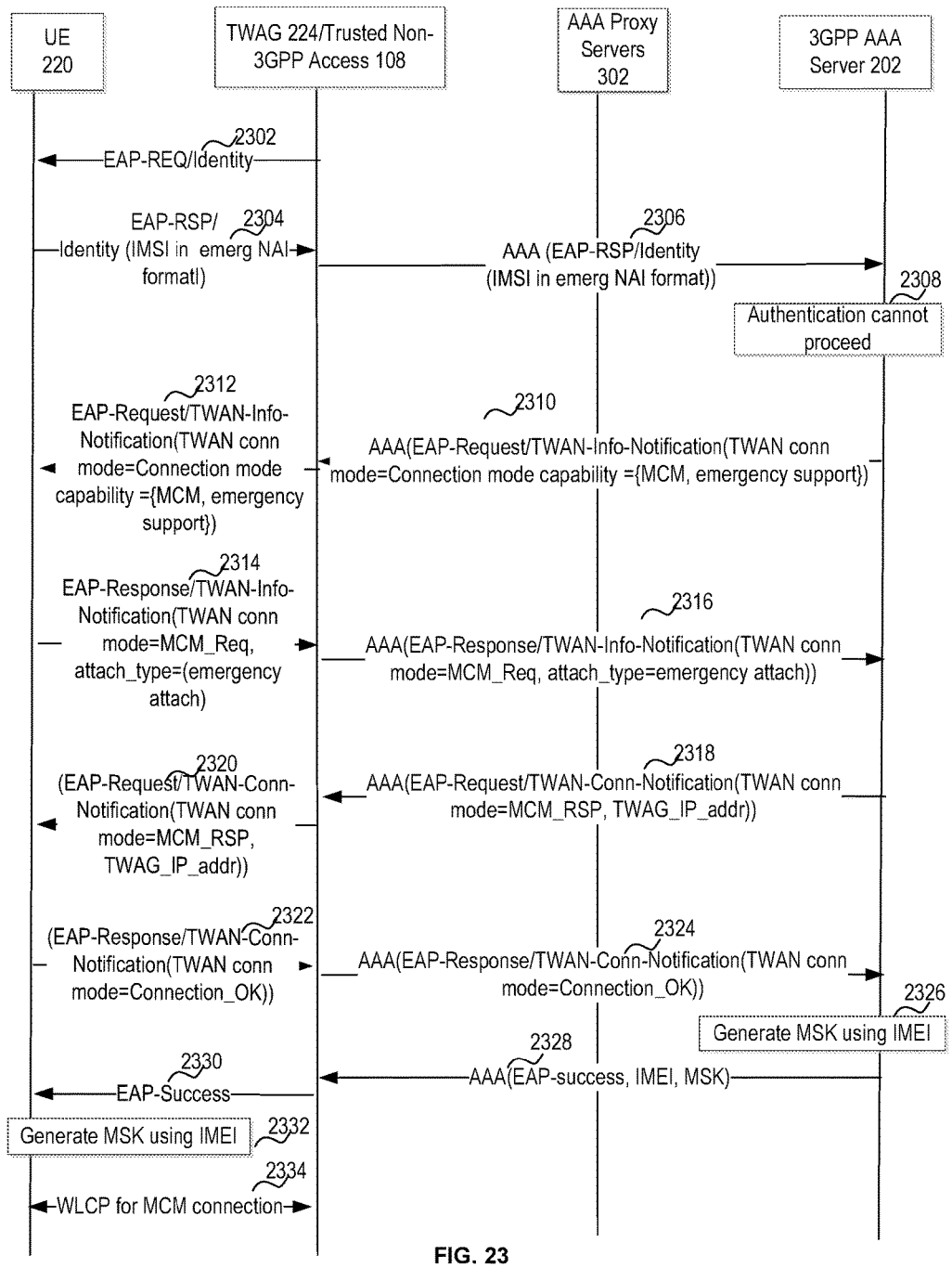
FIG. 23 illustrates a logical flow diagram of an embodiment of a method for emergency session establishment for unauthenticated UE to request an MCM connection type mode using alternative EAP notification.

FIG. 23 illustrates a logical flow diagram of an embodiment of a method for emergency session establishment for unauthenticated UE 220 to request an MCM connection type mode using alternative EAP notification. In this embodiment, the unauthenticated UE 220 does not have UICC capabilities, e.g. the UE 220 does not have a UICC, has an inoperable UICC, etc. The UE 220 does not communicate an IMSI to the AAA server. The UE 220 provides an IMEI in emergency NAI format to the AAA.

An EAP-REQ/Identity message is transmitted to the UE 220 over the access network 108 at 2302. The UE 220 responds with an IMSI in emergency NAI format to the AAA server 202 in an EAP message with an identity response (EAP-RSP/Identity) at 2304. The access network 108 (such as an AP or TWAG 224) forwards an AAA(EAP-RSP/Identity) message with the IMSI in emergency NAI format to the AAA server 202 at 2306.

The AAA server 202 determines that authentication cannot proceed at 2308 and then transmits an EAP packet that includes a TWAN-Info-Notification Data field at 2310. The TWAN-Info-Notification Data field (TWAN conn mode) includes a Network connection mode capability that indicates MCM and emergency support. The AAA server 202 thus initiates an emergency session by default for unauthenticated UEs 220 using MCM mode. The access network 108 then transmits the TWAN-Info-Notification Data message to the UE 220 at 2312.

The UE 220 requests a connection mode of MCM in an EAP-Response/TWAN-INFO-Notification message to the AAA server at 2314, which is forwarded by the access network 108 to the AAA server 202 at 2316. The TWAN-Info-Notification Data field may further include an attachment type request (emergency attachment) and PDN type and PCO supported.

The AAA server 202 responds with an EAP-Request/TWAN-CONN-Notification message at 2318 that specifies a TWAN connection mode of MCM (TWAN conn mode=MCM_RSP) and an IP address of a TWAG 224 (TWAG_IP_addr) that is forwarded to the UE 220 by the access network 108 at 2320. The UE 220 transmits an EAP-Response/TWAN-CONN-Notification message confirming the connection mode of MCM (TWAN conn mode=Connection_OK) at 2322. The access network 108 forwards the message to the AAA server 202 at 2324. The UE 220 and AAA server 202 then complete the MCM connection. For example, the AAA server 202 generates an MSK using the IMEI of the UE 220 at 2326. The AAA server 202 transmits an EAP-success message with the IMEI and MSK at 2328, which is forwarded to the UE 220 by the access network 108 at 2330. The UE 220 generates the MSK using the IMEI at 2332 and establishes the MCM connection using WLCP at 2334.

When the UE 220 provides an IMEI in emergency NAI format to the AAA server 202, the AAA server 202 initiates an emergency session by default for unauthenticated UEs 220 using MCM mode. The AAA server transmits an EAP-Request Notification message that indicates a TWAN connection mode or connection mode capability supports MCM and emergency session establishment. The UE 220 transmits to the AAA server an EAP-Response/Notification that includes a TWAN connection mode with a request for a connection mode of MCM and an attachment type of emergency session establishment. The AAA server responds with an EAP-Request/Notification message that specifies a TWAN connection mode of MCM and includes a TWAG_IP_address, e.g. an IP address of a trusted wireless access gateway (TWAG). The UE 220 sends an EAP-Response/Notification message confirming the connection mode of MCM is accepted. The unauthenticated UE 220 then initiates connection establishment using the WLCP protocol towards the identified TWAG in the access network using the TWAG_IP_address received from AAA server. The UE 220 and the TWAG then establish the MCM connection.

Figure 24:
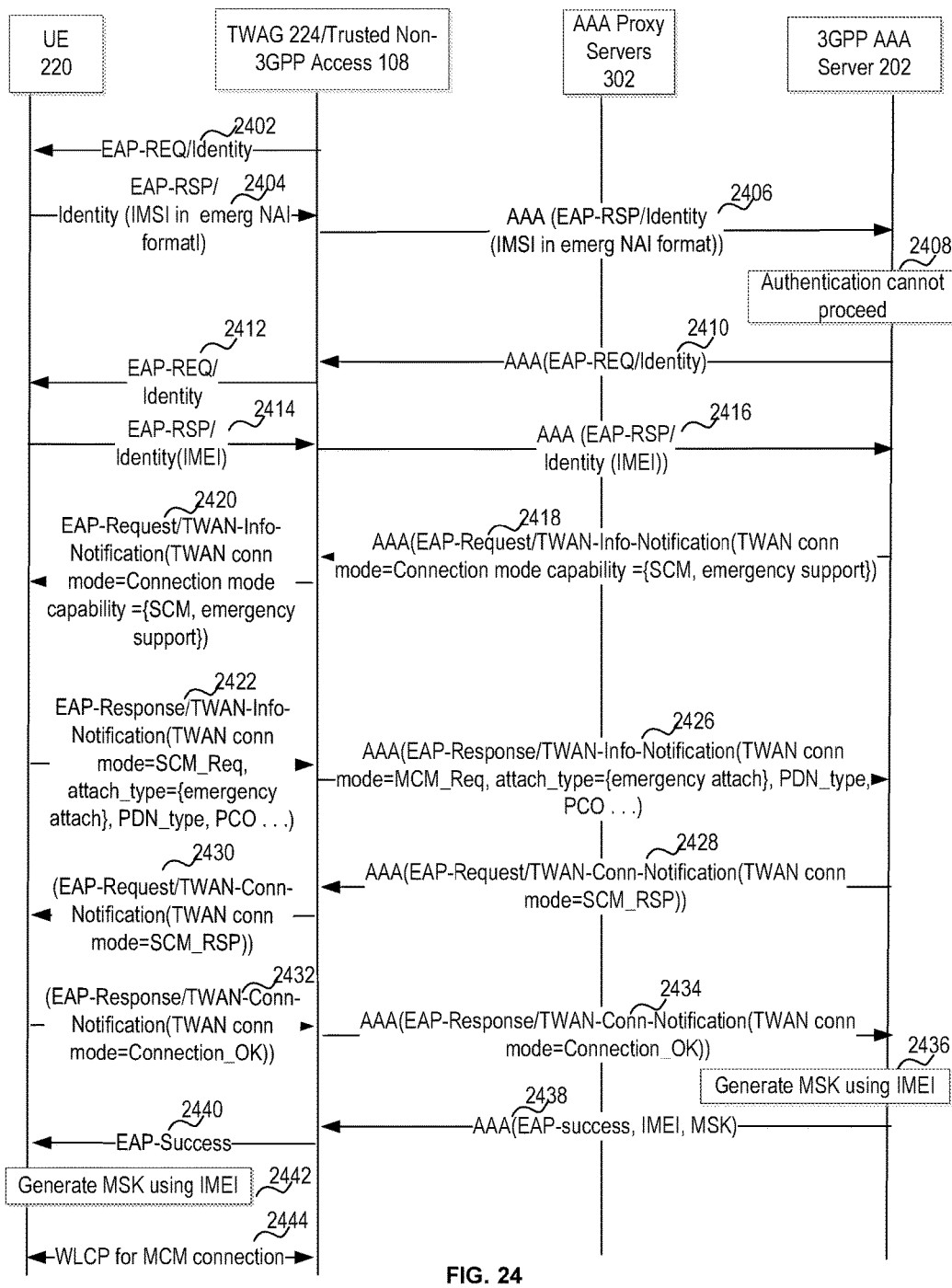
FIG. 24 illustrates a logical flow diagram of an embodiment of a method for emergency session establishment for unauthenticated UE to request an SCM connection type mode using alternative EAP notification.

FIG. 24 illustrates a logical flow diagram of an embodiment of a method for emergency session establishment for unauthenticated UE 220 to request an SCM connection type mode using alternative EAP notification. The access network 108 (such as a TWAG 224, AP or other authenticator in the trusted non-3GPP access network 108) transmits an EAP identity request message (EAP-REQ/Identity) to the UE 220 at 2402. In this embodiment, the UE 220 provides an IMSI in an emergency NAI format to the AAA server 202 in an EAP message with an identity response (EAP-RSP/Identity) at 2404. The access network 108 forwards the AAA(EAP-RSP/Identity) message with the IMSI in the emergency NAI format to the AAA server 202 at 2406. An optional proxy server may reside between the AAA server and the unauthenticated UE 220 for relaying the messages.

The AAA server 202 determines that authentication cannot proceed at 2408 and requests further identification in an AAA(EAP-REQ/Identity) message to the UE 220 at 2410. The EAP-REQ/Identity message is transmitted to the UE 220 over the access network 108 at 2412. The UE 220 responds with an IMEI to the AAA server 202 in an EAP message with an identity response (EAP-RSP/Identity) at 2414. The access network 108 (such as an AP or TWAG 224) forwards an AAA(EAP-RSP/Identity) message with the IMEI to the AAA server 202 at 2416.

The AAA server 202 then transmits an EAP packet that includes a TWAN-Info-Notification Data field at 2418. The TWAN-Info-Notification Data field (TWAN conn mode) includes a Network connection mode capability that indicates SCM and emergency support. The AAA server 202 thus initiates an emergency session by default for unauthenticated UEs 220 using SCM mode. The access network 108 then transmits the TWAN-Info-Notification Data message to the UE 220 at 2420.

The UE 220 requests a connection mode of SCM in an EAP-Response/TWAN-INFO-Notification message (TWAN conn mode=SCM_Req) to the AAA server at 2424, which is forwarded by the access network 108 to the AAA server 202 at 2426. The TWAN-Info-Notification Data field may further include an attachment type request (emergency attachment) and PDN type and PCO supported.

The AAA server 202 responds with an EAP-Request/TWAN-CONN-Notification message at 2428 that specifies a TWAN connection mode of SCM (TWAN conn mode=SCM_RSP) and an IP address of a TWAG 224 (TWAG_IP_addr) that is forwarded to the UE 220 by the access network 108 at 2430. The UE 220 transmits an EAP-Response/TWAN-CONN-Notification message confirming the connection mode of SCM (TWAN conn mode=Connection_OK) at 2432. The access network 108 forwards the message to the AAA server 202 at 2434. The UE 220 and AAA server 202 then complete the SCM connection. For example, the AAA server 202 generates an MSK using the IMEI of the UE 220 at 2436. The AAA server 202 transmits an EAP-success message with the IMEI and MSK at 2438, which is forwarded to the UE 220 by the access network 108 at 2440. The UE 220 generates the MSK using the IMEI at 2442 and establishes the MCM connection using WLCP at 2444.

In this embodiment, the unauthenticated UE 220 provides an IMSI in emergency NAI format to the AAA server and an IMEI. The AAA server transmits an EAP-Request Notification message that indicates a TWAN connection mode or connection mode capability includes SCM and emergency session establishment. The UE 220 transmits to the AAA server an EAP-Response/Notification that includes a TWAN connection mode with a request for a connection mode of SCM and an attachment type of emergency session establishment. The AAA server responds with an EAP-Request/Notification message that specifies a TWAN connection mode of SCM. The UE 220 sends an EAP-Response/Notification message indicating that the connection mode of SCM is acceptable. The UE 220 and the TWAG then establish the SCM connection.

Figure 25:
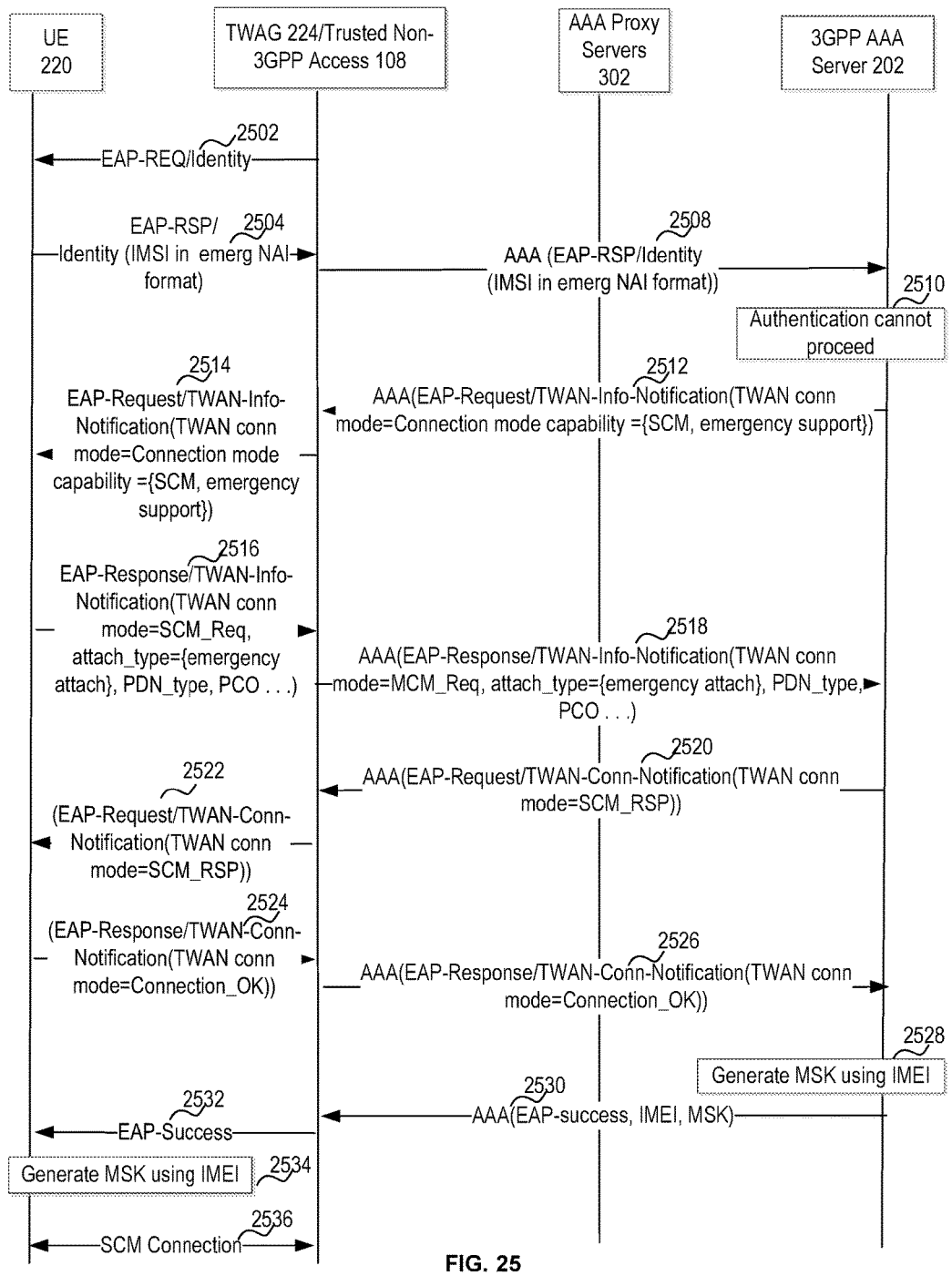
FIG. 25 illustrates a logical flow diagram of an embodiment of a method for emergency session establishment for unauthenticated UE to request an SCM connection type mode using alternative EAP notification.

FIG. 25 illustrates a logical flow diagram of an embodiment of a method for emergency session establishment for unauthenticated UE 220 to request an SCM connection type mode using alternative EAP notification. In this embodiment, the unauthenticated UE 220 does not have UICC capabilities, e.g. the UE 220 does not have a UICC, has an inoperable UICC, etc. The UE 220 does not communicate an IMSI to the AAA server 202. The UE 220 provides an IMEI in an emergency NAI format to the AAA server 202.

An EAP-REQ/Identity message is transmitted to the UE 220 over the access network 108 at 2502. The UE 220 responds with an IMSI in an emergency NAI format to the AAA server 202 in an EAP identity response (EAP-RSP/Identity) at 2504. The access network 108 (such as an AP or TWAG 224) forwards an AAA(EAP-RSP/Identity) message with the IMSI to the AAA server 202 at 2508.

The AAA server 202 determines that authentication of the UE 220 cannot proceed at 2510 and then transmits an EAP packet that includes a TWAN-Info-Notification Data field at 2512. The TWAN-Info-Notification Data field (TWAN conn mode) includes a Network connection mode capability that indicates SCM and emergency support. The AAA server 202 thus initiates an emergency session by default for unauthenticated UEs 220 using SCM mode. The access network 108 then transmits the TWAN-Info-Notification Data message to the UE 220 at 2514.

The UE 220 requests a connection mode of SCM in an EAP-Response/TWAN-INFO-Notification message (TWAN conn mode=SCM_Req) to the AAA server at 2516, which is forwarded by the access network 108 to the AAA server 202 at 2518. The TWAN-Info-Notification Data field may further include an attachment type request (emergency attachment) and PDN type and PCO supported.

The AAA server 202 responds with an EAP-Request/TWAN-CONN-Notification message at 2520 that specifies a TWAN connection mode of SCM (TWAN conn mode=SCM_RSP) that is forwarded to the UE by the access network 108 at 2522. The UE 220 transmits an EAP-Response/TWAN-CONN-Notification message confirming the connection mode of SCM (TWAN conn mode=Connection_OK) at 2524. The access network 108 forwards the message to the AAA server 202 at 2526. The UE 220 and AAA server 202 then complete the SCM connection. For example, the AAA server 202 generates an MSK using the IMEI of the UE 220 at 2528. The AAA server 202 transmits an EAP-success message with the IMEI and MSK at 2530, which is forwarded to the UE 220 by the access network 108 at 2532. The UE 220 generates the MSK using the IMEI at 2534 and establishes the SCM connection using WLCP at 2536.

In this embodiment, the AAA server 202 transmits an EAP-Request Notification message that indicates a TWAN connection mode or connection mode capability includes SCM and emergency session establishment. The UE 220 transmits to the AAA server 202 an EAP-Response/Notification that includes a TWAN connection mode with a request for a connection mode of SCM and an attachment type of emergency session establishment. The AAA server 202 responds with an EAP-Request/Notification message that specifies a TWAN connection mode of SCM. The UE 220 sends an EAP-Response/Notification message indicating that the connection mode of SCM is acceptable. The UE 220 and the TWAG 224 then establish the SCM connection.

Figure 26:
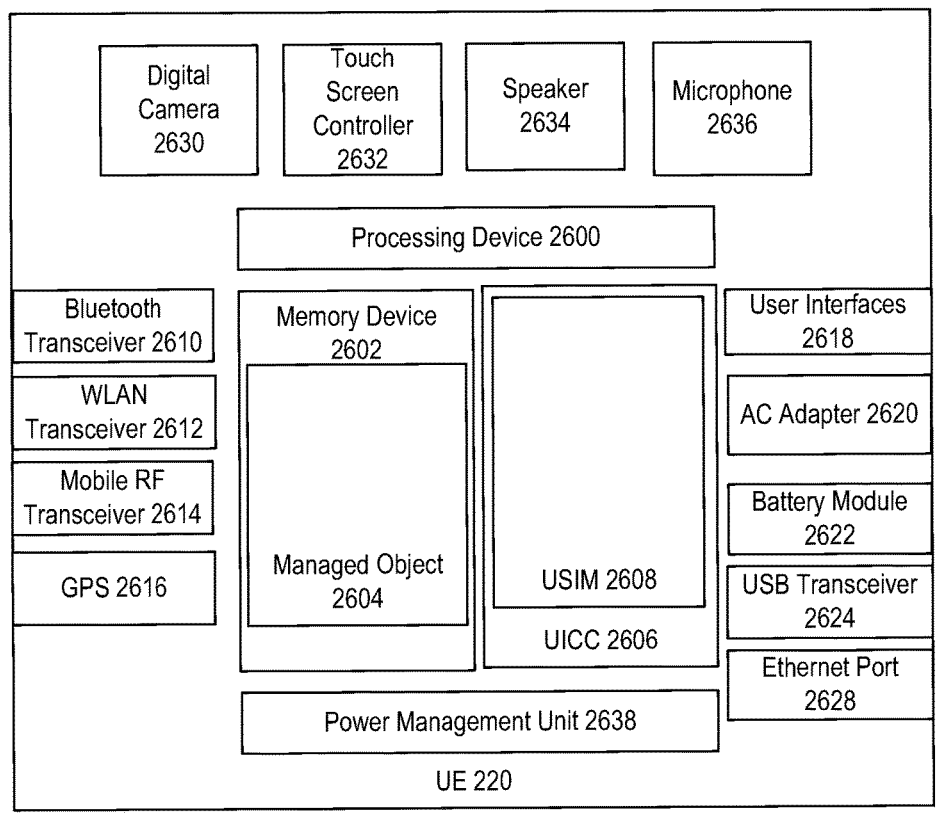
FIG. 26 illustrates a schematic block diagram of an embodiment of example user equipment.

FIG. 26 illustrates a schematic block diagram of an embodiment of example user equipment 220. The user equipment (UE) 220 may include a smart phone, smart tablet, laptop, smart watch, PC, TV or other device. Additional or alternative components and functions may be included within the UE 220. In addition, one or more of the functions and components shown herein may not be present or combined with other components or functions.

The UE 220 includes a processing device 2600 and memory device 2602 that are configured to perform one or more of the functions described herein with respect to the UE 220. The memory device 2602 may include a managed object 2604 that stores applications and operational instructions that controls the processing device 2600 to perform various functions described herein. The UE 220 may also include a UICC 2606 that includes a USIM 2608 for storage of the IMSI. In other embodiments, the UE 220 does not have UICC capabilities, e.g. the UE 220 does not have a UICC 2606, has an inoperable UICC 2606, etc.

The UE 220 may further include a Bluetooth transceiver 2610, a WLAN (IEEE 802.11x compliant) transceiver 2612, mobile RF (3G/4G) transceiver 2614 and GPS 2616. The WLAN transceiver 2612 may operate as a non-3GPP access interface to a WLAN network. The UE 220 may further include user interfaces 2618, AC adapter 2620, battery module 2622, USB transceiver 2624 and Ethernet Port 2628.

The UE 220 may further include a digital camera 2630, touch screen controller 2632, speaker 2634 and microphone 2636. The UE 220 may also include a power management unit 2638. One or more internal communication buses (not shown) may communicatively couple one or more of the components of the UE 220.

Figure 27:
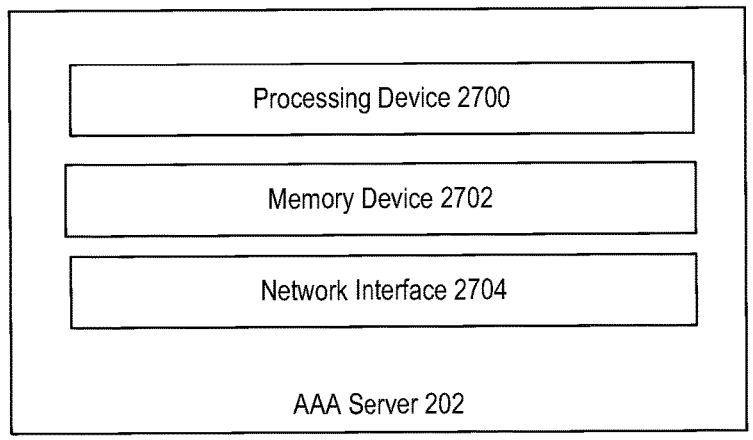
FIG. 27 illustrates a schematic block diagram of an embodiment of an example AAA server.

FIG. 27 illustrates a schematic block diagram of an embodiment of an example AAA server 202. The AAA server 202 may be integrated with other nodes in the EPC network 100. Additional or alternative components and functions may be included within the AAA server 202. In addition, one or more of the functions and components shown herein may not be present or combined with other components or functions. The AAA server 202 includes a processing device 2700 and memory device 2702 that are configured to perform one or more of the functions described herein. The AAA server 202 may include a network interface 2704 that includes ports for interfacing to other network nodes in the EPC network 100.

Figure 28:
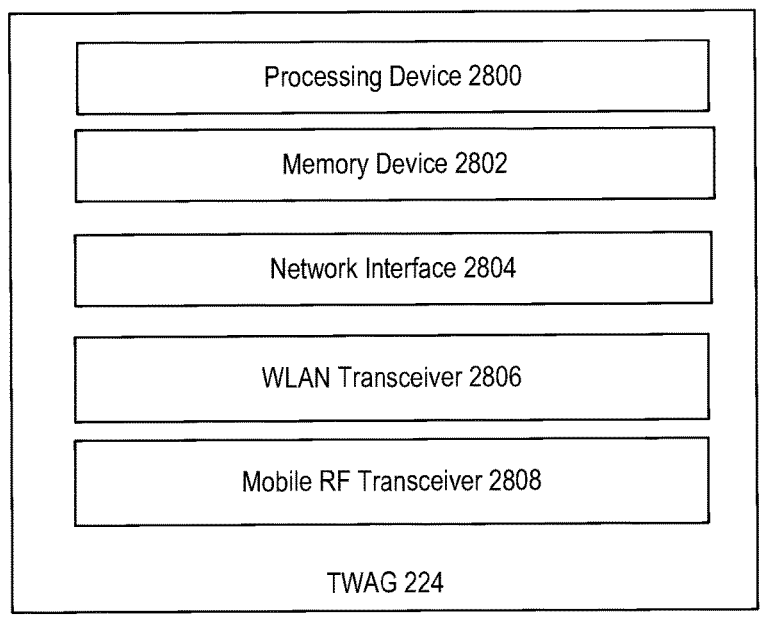
FIG. 28 illustrates a schematic block diagram of an embodiment of an example TWAG.

FIG. 28 illustrates a schematic block diagram of an embodiment of an example TWAG 224. The TWAG 224 may be an access point in a wireless local area network, a gateway in a local area network, etc. The TWAG 224 may be integrated with other nodes in the access network 108. Additional or alternative components and functions may be included within the TWAG 224. In addition, one or more of the functions and components shown herein may not be present or combined with other components or functions. The TWAG 224 includes a processing device 2800 and memory device 2802 that are configured to perform one or more of the functions described herein. The TWAG 224 may include a network interface 2804 (e.g. Ethernet ports, IP ports) for interfacing to other network nodes in the EPC network 100 or access network 108 or the UE 220. The TWAG 224 may also include a WLAN transceiver 2806 (e.g., compliant with IEEE 802.11a, b, c, g, ac type networks). The TWAG 224 may also include a mobile RF transceiver 2808 compliant with a cellular air interface. The UE 220 may communicate with the TWAG 224 using one or more of the WLAN transceiver 2806, Mobile RF transceiver 2808 or network interface 2804.

Figure 29:
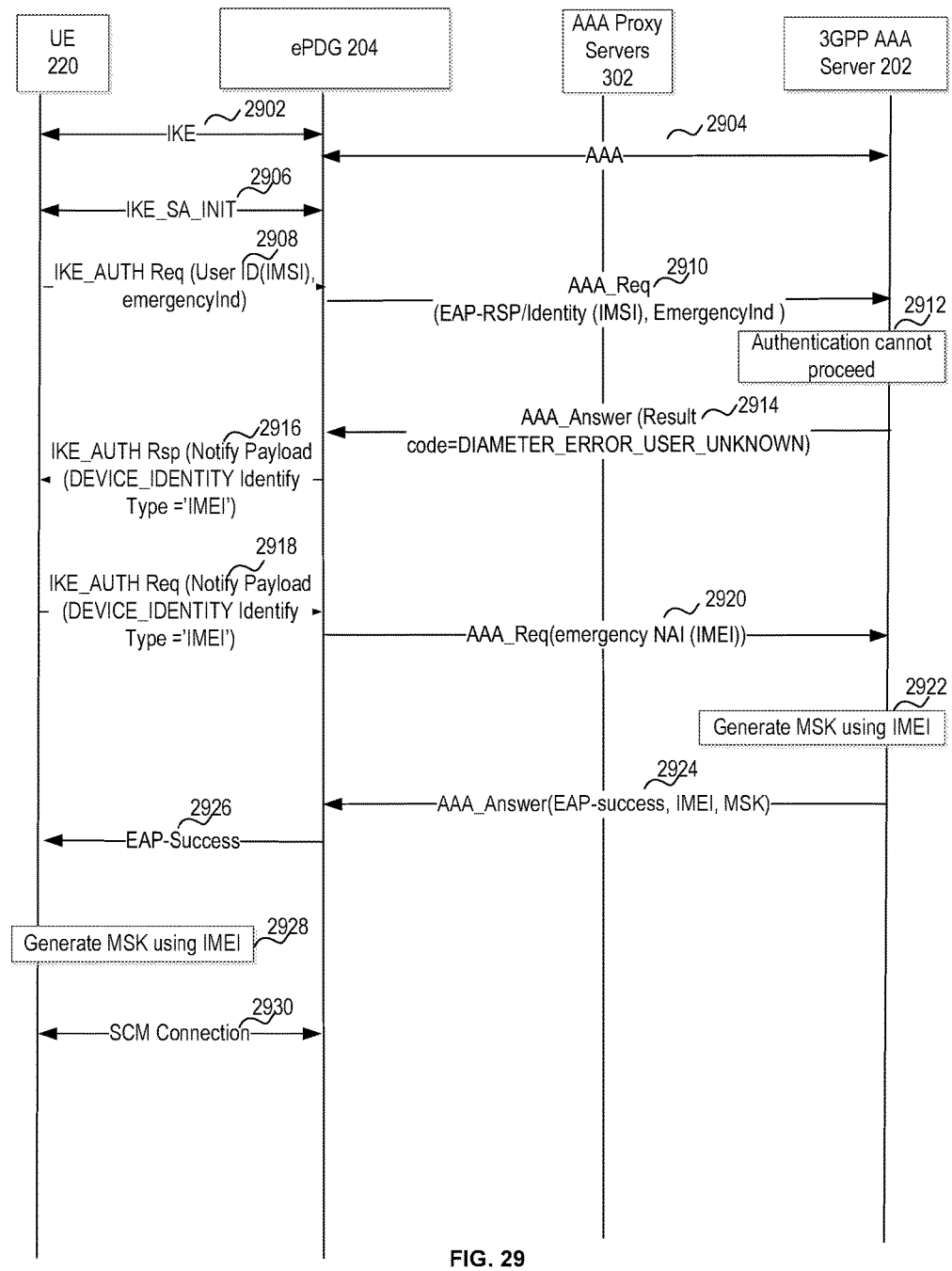
FIG. 29 illustrates a logical flow diagram of an embodiment of an alternative emergency session establishment for an unauthenticated UE 220 over an untrusted access network 110.

FIG. 29 illustrates a logical flow diagram of an embodiment of an alternative emergency session establishment for an unauthenticated UE 220 over an untrusted access network 110. The diagram illustrates a method for emergency session establishment for unauthenticated UEs 220 over an untrusted access network 110. An Internet Key Exchange (IKE, sometimes IKEv1 or IKEv2, depending on version) is the protocol used to set up a security association (SA) in the IPsec protocol suite. An IKE exchange is performed between the UE 220 and ePDG 204 at 2902. The Diameter Extensible Authentication Protocol (EAP) Application specifies EAP packets between a Network Access Server (NAS) working as an EAP Authenticator and a back-end authentication server, as further described in IETF RFC 4072, "Diameter EAP Application", dated August 2005 and incorporated by reference herein. The EAP protocol is initiated between the ePDG 204 and the AAA server 202 at 2904.

An IKE_SA initiate message is transmitted to the UE 220 over the access network 110 at 2906. The UE 220 responds with an IMSI and an emergency indicator (emergencyIND) to the AAA server 202 in IKE_AUTH request message at 2908. The access network 110 (such ePDG 204) forwards an AAA_Req(EAP-RSP/Identity) message with the IMSI and emergency indicator to the AAA server 202 at 2910. The AAA server 202 determines that authentication of the UE 220 cannot proceed at 2912.

When the received subscriber identity is an IMSI but the IMSI authentication cannot proceed at 2912, the AAA Server 202 skips the EAP-AKA authentication procedures and indicates to the ePDG 204 that authentication cannot proceed with the result code set to DIAMETER_ERROR_USER_UNKNOWN at 2914 in an AAA_Answer. The ePDG 204 then requests the IMEI from the UE 220 by including the DEVICE_IDENTITY Notify payload in the IKE_AUTH response message sent to the UE 220 at 2916. The Identity Type field in the Notify payload is set to "IMEI". The UE 220 provides its IMEI in the DEVICE_IDENTITY Notify payload of the IKE_AUTH Request message at 2918. The ePDG 204 forwards the received IMEI to the 3GPP AAA server at 2920.

The UE 220 and AAA server 202 then complete the SCM connection. For example, the AAA server 202 generates an MSK using the IMEI of the UE 220 at 2922. The AAA server 202 transmits an EAP-success message with the IMEI and MSK at 2924, which is forwarded to the UE 220 by the ePDG 204 at 2926. The UE 220 generates the MSK using the IMEI at 2928 and establishes the SCM connection with the EPDG 204 at 2930.

A processing device as described herein includes at least one processing device, such as a microprocessor, microcontroller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. A memory device is a non-transitory memory device and may be an internal memory or an external memory, and the memory may be a single memory device or a plurality of memory devices. The memory device may be a read-only memory, random access memory, volatile memory, non-volatile memory, static memory, dynamic memory, flash memory, cache memory, and/or any non-transitory memory device that stores digital information. The term "module" is used in the description of one or more of the embodiments of elements herein. A module includes one or more processing devices and/or one or more non-transitory memory devices operable to perform one or more functions as may be described herein. A module may operate independently and/or in conjunction with other modules and may utilize the processing device and/or memory of other modules and/or operational instructions of other modules. As also used herein, a module may contain one or more sub-modules, each of which may be one or more modules.

As may be used herein, the term "operable to" or "configurable to" indicates that an element includes one or more of circuits, instructions, modules, data, input(s), output(s), etc., to perform one or more of the described or necessary corresponding functions and may further include inferred coupling to one or more other items to perform the described or necessary corresponding functions. As may also be used herein, the term(s) "coupled", "coupled to", "connected to" and/or "connecting" or "interconnecting" includes direct connection or link between nodes/devices and/or indirect connection between nodes/devices via an intervening item (e.g., an item includes, but is not limited to, a component, an element, a circuit, a module, a node, device, network element, etc.). As may further be used herein, inferred connections (i.e., where one element is connected to another element by inference) includes direct and indirect connection between two items in the same manner as "connected to".

Note that the aspects of the present disclosure may be described herein as a process that is depicted as a schematic, a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

The various features of the disclosure described herein can be implemented in different systems and devices without departing from the disclosure. It should be noted that the foregoing aspects of the disclosure are merely examples and are not to be construed as limiting the disclosure. The description of the aspects of the present disclosure is intended to be illustrative, and not to limit the scope of the claims. As such, the present teachings can be readily applied to other types of apparatuses and many alternatives, modifications, and variations will be apparent to those skilled in the art.

In the foregoing specification, certain representative aspects of the invention have been described with reference to specific examples. Various modifications and changes may be made, however, without departing from the scope of the present invention as set forth in the claims. The specification and figures are illustrative, rather than restrictive, and modifications are intended to be included within the scope of the present invention. Accordingly, the scope of the invention should be determined by the claims and their legal equivalents rather than by merely the examples described. For example, the components and/or elements recited in any apparatus claims may be assembled or otherwise operationally configured in a variety of permutations and are accordingly not limited to the specific configuration recited in the claims.

Furthermore, certain benefits, other advantages and solutions to problems have been described above with regard to particular embodiments; however, any benefit, advantage, solution to a problem, or any element that may cause any particular benefit, advantage, or solution to occur or to become more pronounced are not to be construed as critical, required, or essential features or components of any or all the claims.

As used herein, the terms "comprise," "comprises," "comprising," "having," "including," "includes" or any variation thereof, are intended to reference a nonexclusive inclusion, such that a process, method, article, composition or apparatus that comprises a list of elements does not include only those elements recited, but may also include other elements not expressly listed or inherent to such process, method, article, composition, or apparatus. Other combinations and/or modifications of the above-described structures, arrangements, applications, proportions, elements, materials, or components used in the practice of the present invention, in addition to those not specifically recited, may be varied or otherwise particularly adapted to specific environments, manufacturing specifications, design parameters, or other operating requirements without departing from the general principles of the same.

Moreover, reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is intended to be construed under the provisions of 35 U.S.C. § 112(f) as a "means-plus-function" type element, unless the element is expressly recited using the phrase "means for" or, in the case of a method claim, the element is recited using the phrase "step for."

What is claimed is:

1. A method of establishing a network connection for emergency services between a 3rd Generation Partnership Project (3GPP) core network and user equipment (UE) in a non-3GPP compliant access network, comprising:
   obtaining an identifier for the UE;
   initiating an authentication process in accordance with an authentication protocol;
   determining the UE is unauthenticated when the authentication process fails to authenticate the UE with the 3GPP core network;
   negotiating one of a plurality of connection modes with the unauthenticated UE to establish a network connection for emergency services, by:
      communicating the plurality of network connection modes to the unauthenticated UE, wherein the plurality of network connection modes includes: a single-connection mode (SCM) and a multi-connection mode (MCM); and
      receiving a selection of one of the plurality of network connection modes from the unauthenticated UE; and
   establishing the network connection for emergency services between the 3GPP core network and the unauthenticated UE through the non-3GPP compliant access network with the selected one of the plurality of connection modes.

2. The method of claim 1, wherein negotiating the one of the plurality of connection modes with the unauthenticated UE further comprises:
   communicating a network connection capability to the unauthenticated UE by an authentication, authorization and accounting (AAA) server, wherein the network connection capability includes the plurality of network connection modes and an attachment type.

3. The method of claim 2, wherein communicating the network connection capability to the unauthenticated UE by the AAA server, comprises:
   transmitting by the AAA server an Extensible Authentication Protocol (EAP) protocol packet including a field with the network connection capability.

4. The method of claim 3, further comprising:
   wherein the EAP protocol packet further includes a field indicating whether the AAA server supports session establishment for emergency services.

5. The method of claim 4, further comprising:
   wherein the EAP protocol packet further includes a field indicating network parameters.

6. The method of claim 2, wherein receiving the selection of one of the plurality of network connection modes from the unauthenticated UE comprises:
   receiving by the AAA server another EAP protocol packet from the unauthenticated UE including a field with the selected network connection mode, wherein the selected network connection mode includes at least one of: a single-connection mode (SCM) or a multi-connection mode (MCM).

7. The method of claim 6, further comprising:
   when the unauthenticated UE selects the SCM mode in the another EAP protocol packet, transmitting to the unauthenticated UE supported connection parameters for the SCM mode.

8. The method of claim 6, further comprising:
   when the unauthenticated UE selects the MCM mode in the another EAP protocol packet, transmitting an IP address of a trusted wireless access network gateway to the unauthenticated UE.

9. An authentication server for establishing a network connection for emergency services to user equipment (UE) in a non-3GPP compliant access network, wherein the non-3GPP compliant access network is compliant with technologies that are not standardized by the 3GPP set of standards, comprising:
   a network interface to a 3GPP core network and to the non-3GPP compliant access network;
   at least one processing device configured to:
      obtain an identity for the UE;
      initiate an authentication process in accordance with an authentication protocol;
      determine the UE is unauthenticated when the authentication process fails to authenticate the UE;
      negotiate one of a plurality of connection modes with the unauthenticated UE by:
         communicating the plurality of network connection modes to the unauthenticated UE, wherein the plurality of network connection modes includes: a single-connection mode (SCM) and a multi-connection mode (MCM); and
         receiving a selection of one of the plurality of network connection modes from the unauthenticated UE; and negotiate connection parameters for the selected connection mode with the unauthenticated UE; and establish the network connection for emergency services between the 3GPP core network and the unauthenticated UE through the non-3GPP compliant access network.

10. The authentication server of claim 9, wherein the processing device is further configured to:

transmit an EAP protocol packet including connection parameters for the selected connection mode with the unauthenticated UE.

11. The authentication server of claim 9, wherein the processing device is further configured to:

determine the selected connection mode includes an MCM mode; and transmit to the UE an IP address of a trusted wireless access network gateway in the non-3GPP compliant access network.

12. The authentication server of claim 9, wherein the processing device is further configured to:

determine the selected connection mode includes an SCM mode; and transmit to the UE supported connection parameters for the SCM mode.

13. An authentication server in a 3GPP core packet network for establishing a network connection to user equipment (UE) in a non-3GPP compliant wireless access network, comprising:

a network interface configured to communicate with the 3GPP core packet network and to the UE in the non-3GPP compliant access network;

at least one processing device configured to:

receive an identity of the UE, wherein the identity is in a format that indicates an emergency;

initiate an authentication process in accordance with an authentication protocol;

determine the UE is unauthenticated when the authentication process fails to authenticate the UE;

negotiating one of a plurality of connection modes with the unauthenticated UE to establish an emergency session, by:

communicating the plurality of network connection modes to the unauthenticated UE, wherein the plurality of network connection modes includes: a single-connection mode (SCM) and a multi-connection mode (MCM); and receiving a selection of one of the plurality of network connection modes from the unauthenticated UE; and initiate an emergency session by default for the unauthenticated UE.

14. The authentication server of claim 13, wherein the processing device is configured to initiate the emergency session by:

generating a notification message to the UE that indicates a connection mode of MCM and emergency session establishment.

15. The authentication server of claim 14, wherein the processing device is further configured to:

receive a response message from the UE that includes a request for a connection mode of MCM and an attachment type of emergency session establishment; and generate another Notification message that specifies a connection mode of MCM and includes an IP address of a trusted wireless access gateway (TWAG) in the non-3GPP compliant access network.

16. The authentication server of claim 13, wherein the processing device is configured to initiate the emergency session by:

generating a notification message to the UE that indicates a connection mode of SCM and emergency session establishment.

17. The authentication server of claim 16, wherein the processing device is further configured to:

receive a response message from the UE that includes a request for a connection mode of SCM and an attachment type of emergency session establishment; and generate another Notification message that specifies a connection mode of SCM and includes supported network parameters.

18. A method of establishing a network connection between a 3GPP core network and user equipment (UE) in a non-3GPP compliant access network, comprising:

obtaining an identifier for the UE, wherein the identifier for the UE includes an indicator of an emergency session;

determining the UE is unauthenticated when an authentication process fails to authenticate the UE using the identifier for the UE and an authentication protocol;

negotiating one of a plurality of connection modes with the unauthenticated UE to establish an emergency session, by:

communicating the plurality of network connection modes to the unauthenticated UE, wherein the plurality of network connection modes includes: a single-connection mode (SCM) and a multi-connection mode (MCM); and receiving a selection of one of the plurality of network connection modes from the unauthenticated UE; and establishing the emergency session to the unauthenticated UE by default through the access network.

* * * * *